(12) United States Patent
Inukai

(10) Patent No.: US 8,174,734 B2
(45) Date of Patent: May 8, 2012

(54) REDUCTION OF MEMORY SIZE REQUIRED FOR CORRECTION OF DISPLACEMENT OF SCAN POSITIONS

(75) Inventor: Yoshihiro Inukai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1566 days.

(21) Appl. No.: 11/563,081

(22) Filed: Nov. 24, 2006

(65) Prior Publication Data

US 2007/0121169 A1 May 31, 2007

(30) Foreign Application Priority Data

Nov. 29, 2005 (JP) ................................ 2005-343520
Nov. 7, 2006 (JP) ................................ 2006-302139

(51) Int. Cl.
*H04N 1/04* (2006.01)
(52) U.S. Cl. ...................................... 358/448; 358/474
(58) Field of Classification Search .................... 358/448
See application file for complete search history.

(56) References Cited

U.S. PATENT DOCUMENTS 4,866,512 A * 9/1989 Hirosawa et al. ............. 358/514

FOREIGN PATENT DOCUMENTS

| JP | 2632871 | 4/1997 |
|---|---|---|
| JP | 9-270898 | 10/1997 |
| JP | 11-164093 | 6/1999 |
| JP | 3048158 | 3/2000 |
| JP | 2001-16442 A | 1/2001 |
| JP | 2002-247292 | 8/2002 |
| JP | 3379462 | 12/2002 |
| JP | 2005-117667 | 4/2005 |
| JP | 2007-194933 A | 8/2007 |

OTHER PUBLICATIONS

Office Action issued Feb. 22, 2011, in Japanese Patent Application No. 2006-320471.

* cited by examiner

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

An apparatus for correcting a scanned image includes a delay circuit configured to delay first image data by a delay amount corresponding to an integer multiple of a line interval, an interpolation circuit configured to perform an interpolation computation responsive to interpolation coefficients with respect to two or more lines included in the first image data delayed by the delay circuit, and a control circuit configured to set the delay amount to the delay circuit and the interpolation coefficients to the interpolation circuit, wherein the control circuit is configured to set the delay amount to an amount corresponding to integer m smaller than integer n and set the interpolation coefficients such that the interpolation computation becomes equivalent to a computation introducing a delay equal to n−m lines if an interval between the first image data and second image data is n times the line interval.

9 Claims, 30 Drawing Sheets

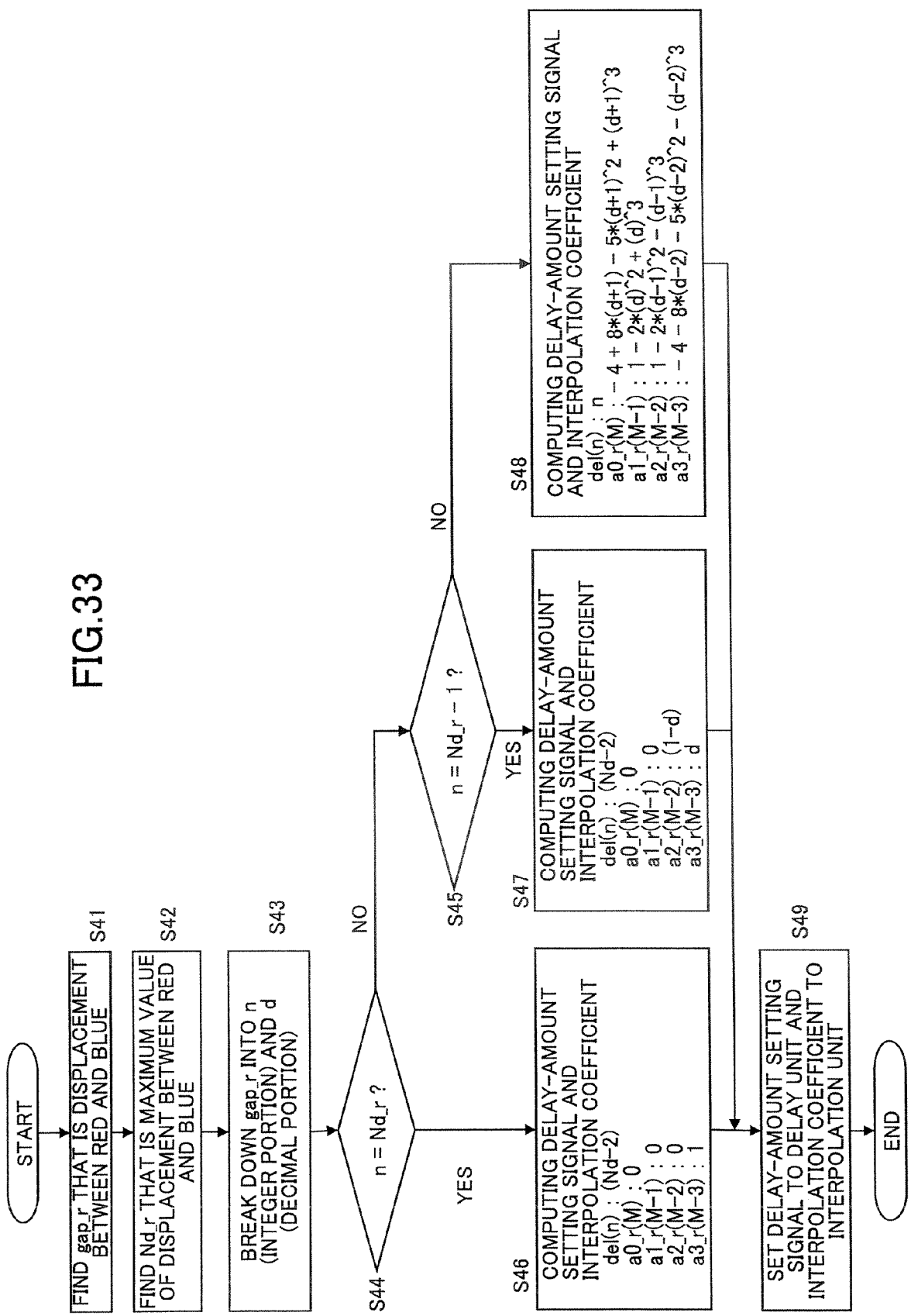

REDUCTION OF MEMORY SIZE REQUIRED FOR CORRECTION OF DISPLACEMENT OF SCAN POSITIONS

BACKGROUND OF THE INVENTION

1. Field of the Invention

The present invention relates to a scanned image correcting apparatus for correcting the displacements of scan positions in scanned image data (image signals) that are scanned by a plurality of line image sensors (scan means), an image scan apparatus such as a scanner equipped with such a scanned image correcting apparatus, and an image forming apparatus such as a copier machine, a multifunctional machine, or a facsimile machine that is equipped with such an image scan apparatus.

2. Description of the Related Art

In a conventional image scan apparatus such as a scanner, as shown in FIG. 6, a color image sensor (i.e., three-line color CCD) 207 is used to perform a scan where the color image sensor 207 includes individual line sensors 10$r$, 10$g$, and 10$b$ corresponding to R, G, and B. The line sensors 10$r$, 10$g$, and 10$b$ corresponding to R, G, and B are arranged in parallel at intervals each equal to a predetermined pitch L.

Since the line sensors 10$r$, 10$g$, and 10$b$ are arranged in parallel at the predetermined pitch L, scan positions are displaced between the R, G, and B colors by a shift amount corresponding to the predetermined pitch L when a document image is scanned. This can be understood from FIG. 5, in which the document image is scanned from the left to the right (in the sub-scan direction). Namely, the scan positions are displaced by n lines between R and G and between G and B in the sub-scan direction. In order to correct these displacements, with FIG. 5 being used as an example, the R image data that is scanned first is delayed by 2n lines, and the G image data that is scanned next is delayed by n lines, so that these R and G image data are aligned with the B image data that is scanned last. This inter-line correction process eliminates the displacements.

The line interval n between the sensors, however, varies depending on the scan speed of the document image in the sub-scan direction, which is determined by the scan resolution of the image scan apparatus.

In the following, an image scan apparatus with the line sensor interval L corresponding to a scan interval of 4 600-dpi lines will be used as an example.

When the image scan apparatus scans an image at 600 dpi, the displacement between R and B is 8 lines, and the displacement between G and B is 4 lines, as shown in FIG. 31. In this case, the pitch L between the line sensors 10$r$, 10$g$, and 10$b$ corresponding to R, G, and B is an integer multiple of the 1-line scan interval. In this case, the displacements of scan positions can be corrected by performing the inter-line correction process in the same manner as in the related-art arrangement.

When this image scan apparatus scans an image at 400 dpi, on the other hand, scan speed in the sub-scan direction is 3/2 of that of 600 dpi, so that the 1-line scan interval is also 3/2 of that of 600 dpi. Because of this, the displacement between R and B is 16/3 lines, and the displacement between G and B is 8/3 lines, as shown in FIG. 32. In this case, the pitch L between the line sensors 10$r$, 10$g$, and 10$b$ corresponding to R, G, and B is not an integer multiple of the 1-line scan interval. In such a case, there is a problem in that a displacement corresponding to a fraction of one line remains after delaying the R image data and G image data by an integer multiple of the 1-line scan interval as in the related art.

In consideration of this, there is a known technology that uses a delay unit 22 for an integer delay and an interpolation unit 23 for a decimal delay so as to correct a displacement for a decimal delay that remains as an uncorrectable error after the delay by an integer multiple as described above (e.g., see Patent Document 1). In order to perform a delay corresponding to 2.6 lines, for example, the delay unit 22 performs an integer delay corresponding to 2 lines, and the interpolation unit 23 takes care of a decimal delay corresponding to 0.6 lines.

[Patent Document 1] Japanese Patent Application Publication No. 9-270898

In the technology disclosed in Patent Document 1, when the size of the displacement of scan positions is Nd lines at the maximum, e.g., 10 lines at the maximum, a memory is necessary that can temporarily store data for 10 lines for the purpose of correcting the integer-multiple displacement. If the intervals of the RGB line sensors are wide, or if the scan resolution is high, there is a problem of the required memory size being increased.

Accordingly, there is a need for a scheme that can reduce the memory size required for the correction of displacement of scan positions.

SUMMARY OF THE INVENTION

It is a general object of the present invention to provide a displacement correcting scheme that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a displacement correcting apparatus and method particularly pointed out in the specification in such full, clear, concise, and exact terms as to enable a person having ordinary skill in the art to practice the invention.

To achieve these and other advantages in accordance with the purpose of the invention, the invention provides an apparatus for correcting a scanned image by aligning, in a sub-scan direction, first image data and second image data corresponding to two of a plurality of sensor lines, respectively, when the plurality of sensor lines each extending in a main scan direction and arranged at intervals in the sub-scan direction is scanned relative to a scan object in the sub-scan direction such that each of the plurality of sensor lines scans image data at a predetermined line interval in the subs-scan direction. The apparatus includes a delay circuit configured to delay the first image data by a delay amount corresponding to an integer multiple of the line interval, an interpolation circuit configured to perform an interpolation computation responsive to interpolation coefficients with respect to two or more lines included in the first image data delayed by the delay circuit, and a control circuit configured to set the delay amount to the delay circuit and the interpolation coefficients to the interpolation circuit, wherein the control circuit is configured to set the delay amount to an amount corresponding to integer m smaller than integer n and set the interpolation coefficients such that the interpolation computation becomes equivalent to a computation introducing a delay equal to n−m lines if an interval between the first image data and the second image data is n times the line interval.

According to at least one embodiment of the present invention, an apparatus for correcting a scanned image by aligning, in a sub-scan direction, first image data and second image data corresponding to two of a plurality of sensor lines, respectively, when the plurality of sensor lines each extending in a main scan direction and arranged at intervals in the sub-scan direction is scanned relative to a scan object in the sub-scan direction such that each of the plurality of sensor lines scans image data at a predetermined line interval in the subs-scan direction, includes a delay circuit having a first memory having a capacity corresponding to data for m lines (m: integer), and configured to delay the first image data through the first memory by a delay amount corresponding to an integer multiple of the line interval, an interpolation circuit having a second memory having a capacity corresponding to data for at least one line, and configured to perform an interpolation computation responsive to interpolation coefficients with respect to the first image data delayed by the delay circuit and image data made by further delaying, through the second memory, the first image data delayed by the delay circuit, and a control circuit configured to set the delay amount to the delay circuit and the interpolation coefficients to the interpolation circuit, wherein the control circuit is configured to set the delay amount and the interpolation coefficients such as to utilizes the second memory of the interpolation circuit in order to secure a delay equal to n−m lines in excess of the capacity for the m line of the first memory of the delay circuit if an interval between the first image data and the second image data is n (n: integer lager than m) times the line interval, thereby providing a delay corresponding to a total of n lines by use of a combination of the first memory of the delay circuit and the second memory of the interpolation circuit.

According to at least one embodiment of the present invention, the interpolation circuit, which was capable of introducing a decimal delay corresponding to 0.1 to 0.9 lines in the conventional configuration, is made to be capable of introducing a delay corresponding to 0 to 1 line, thereby performing the correction of displacement for one line at the maximum. When the correction of displacement for 10 lines is to be performed with respect to scan image data, for example, the displacement of 10 lines is broken down into a displacement of 9 lines and a displacement of 1 line, so that the delay circuit introduces an integer-multiple delay for the correction of 9-line displacement, and the interpolation circuit introduces a remaining delay for the correction of 1-line displacement. The amount of delay introduced by the interpolation circuit is not limited to one line, and provision may be made such that the interpolation circuit introduces a delay corresponding to multiple lines. In this case, the delay amount needing to be provided by the delay circuit is equal to a displacement remaining after subtracting the multiple lines provided by the interpolation circuit from the entire displacement. In general, the maximum displacement in the sub-scan direction between the scan means (line sensors) is an integer multiple of one line, so that the memory size necessary for the correction of displacement of scan positions can be reduced.

BRIEF DESCRIPTION OF THE DRAWINGS

Other objects and further features of the present invention will be apparent from the following detailed description when read in conjunction with the accompanying drawings; in which:

FIG. 33 is a flowchart showing an example of the setting of the delay-amount setting signal and interpolation coefficients by the displacement controlling unit of FIG. 15, FIG. 22, or FIG. 24 with respect to image data R.

DESCRIPTION OF THE PREFERRED EMBODIMENTS

In the following, the best mode for carrying out the present invention will be described in detail by referring to the accompanying drawings.

First Embodiment

In the following, a description will be given of a first embodiment of an image forming apparatus provided with a scanned image correcting apparatus according to the present invention.

Figure 1:
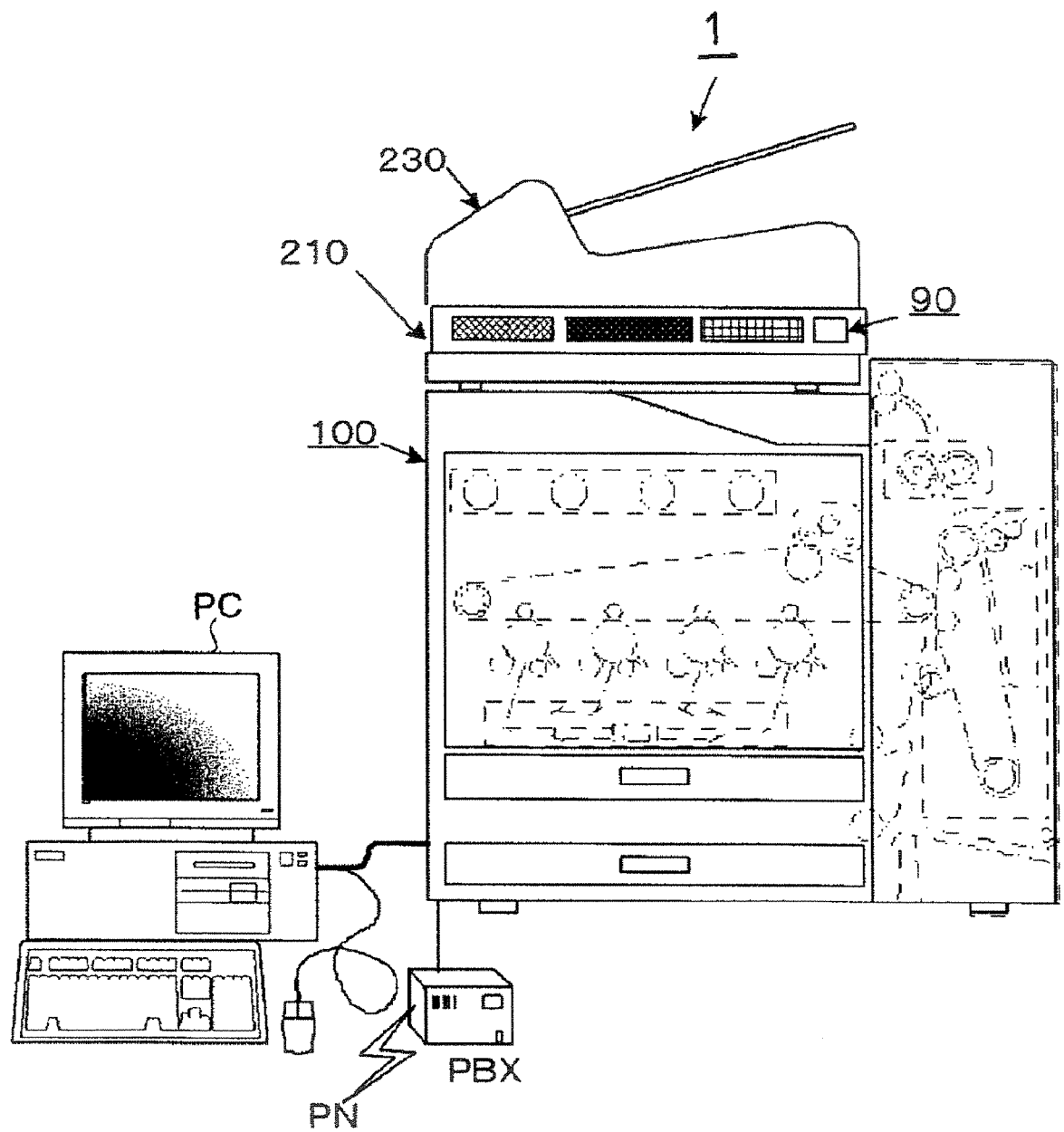
FIG. 1 is a drawing showing an example of the schematic configuration of a copier system inclusive of a digital copier that is an image forming apparatus having a scan image correcting apparatus according to the present invention.

The image forming apparatus of the first embodiment is a multifunctional full-color digital copier (hereinafter simply referred to as a "digital copier") that forms a color image by an electrophotographic process. FIG. 1 is a drawing showing an example of a schematic configuration of the copier system inclusive of the digital copier.

The digital copier 1 includes a plurality of units such as an auto document feeder 230, an operation board 90, a color scanner (image scan apparatus) 210, and a color printer 100. The color scanner 210 on which the operation board 90 and the auto document feeder 230 are mounted is a unit that is separable from the color printer 100. The color scanner 210 includes a control board having power-device drivers, sensor inputs, and a controller, and communicates directly or indirectly with a CPU (see FIG. 4) so as to be controlled as to its timing to scan a document image.

The digital copier 1 further includes a controller board as will later be described. This controller board is connected to a network such as a LAN (local area network) to which a personal computer PC is connected. Further, a facsimile control unit (hereinafter referred to as "FCU") on the controller board is connected to a switch PBX, which is connected to a telephone line PN (i.e., facsimile communication line).

Figure 2:
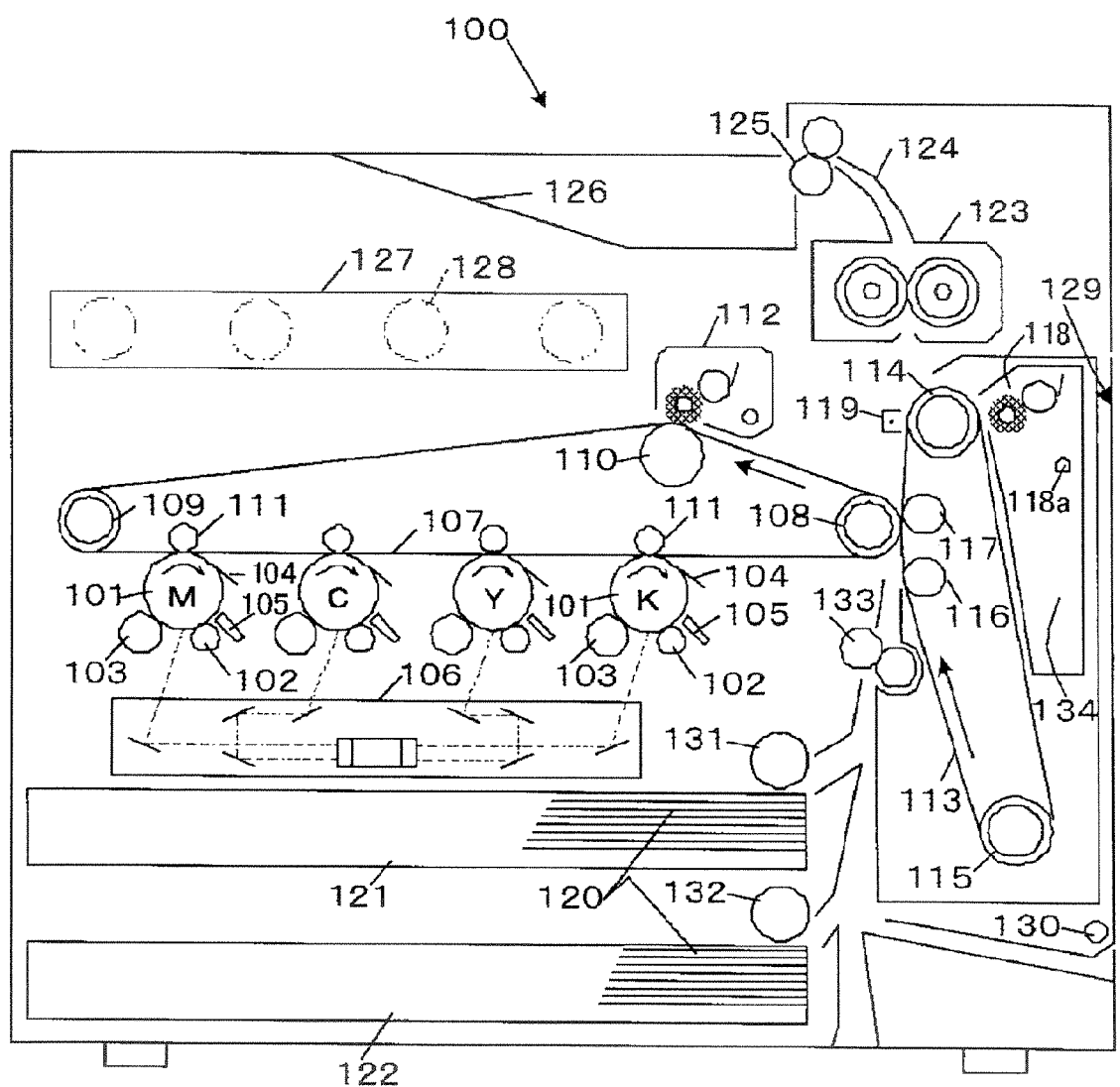
FIG. 2 is a drawing showing an example of the mechanical part configuration of a color printer shown in FIG. 1.

FIG. 2 is a drawing showing an example of the mechanical part configuration of the color printer 100 shown in FIG. 1.

The color printer 100 is a laser printer operating by use of an electrophotographic process. The color printer 100 is a full-color image forming apparatus of a four-tandem-drum type, and includes four image forming units (toner-image forming units) for forming toner images of respective colors, i.e., magenta (M), cyan (C), yellow (Y), and black (K), which are arranged in the following order: M, C, Y, and K, along the direction (sub-scan direction) in which a first transfer belt 107 travels, which is shown by an arrow.

Photoconductive drums 101, each of which is rotatably supported and rotates in the direction shown by arrows, have a surface (outer surface) that faces a charging unit 102, a development unit 103, a cleaning unit 104, and a discharging unit 105. A space is secured between the charging unit 102 and the development unit 103 to allow optical information emitted by an exposure unit 106 to enter. There are four photoconductive drums 101 (101M, 101C, 101Y, and 101K), and the configuration of the surrounding components for image formation is the same between these four. The color of the color material (toner) used by each development unit 103 is different. Each of the photoconductive drums 101 is a photoconductive unit comprised of an Aluminum cylinder with a diameter of 30 mm to 100 mm, on the surface of which an organic semiconductor layer is provided as a photoconductive material. Part of the surface is in contact with the first transfer belt (intermediate transfer belt) 107. It should be noted that a belt-shape photoconductive unit may as well be used in place of the drum-shape photoconductive unit (photoconductive drum).

The first transfer belt 107 is suspended by rotatable supporting rollers 108, 109, and 110 such as to be movable (rotatable) in the direction indicated by an arrow. On the back side (inside of the loop), a first transfer roller (first transfer means) 111 is situated in the proximity of the photoconductive drum 101K. On the external side of the belt loop, a cleaning apparatus 112 for cleaning the first transfer belt 107 is provided. The cleaning apparatus 112 removes needless toner remaining on the surface of the first transfer belt 107 after a toner image (i.e., a multiple-color toner image such as a full-color image or a single-color toner image) is transferred from the first transfer belt 107 to a second transfer belt 113.

The exposure unit 106 uses a known laser-based method, and shines light information (laser light modulated in response to image data) on the evenly-charged surfaces of the photoconductive drums 101 to create latent images as the light information is emitted from four laser-diode (hereinafter referred to as "LD") light sources provided for forming a full-color image. It should be noted that the four LD light sources may be consolidated into a single LD array. Further, an exposure unit that includes an LED array and a focusing unit may alternatively be employed.

The first transfer belt 107 is a belt comprised a resin film or rubber with a thickness of 50 micrometers to 600 micrometers serving as a base material, and has a resistance that allows a toner image to be transferred from the photoconductive drums 101.

The second transfer belt 113 is situated on the right-hand side of the first transfer belt 107 in FIG. 2.

The second transfer belt 113 is suspended by rotatable supporting rollers 114, 115, and 116 such as to be movable in the direction indicated by an arrow. On the back side (inside of the loop), a second transfer roller (second transfer means) 117 is situated. On the external side of the belt loop, a cleaning apparatus 118, a transfer charger 119, and so on for use with the second transfer belt is provided. The cleaning apparatus 118 removes needless toner remaining on the surface of the second transfer belt 113 after a toner image is transferred from the second transfer belt 113 to a paper sheet.

The first transfer belt 107 and the second transfer belt 113 are in contact with each other by the second transfer roller 117 and the supporting rollers 116 and 108, thereby creating a predetermined transfer nip.

The second transfer belt 113 is a belt comprised a resin film or rubber with a thickness of 50 micrometers to 600 micrometers serving as a base material, and has a resistance that allows a toner image to be transferred from the first transfer belt 107.

Paper sheets 120 serving as a record medium are stored in sheet-feeder cassettes 121 and 122 shown at the bottom in FIG. 2, and the paper sheet 120 at the top is pulled out by a sheet-feeder roller 131 or 132 one by one for provision to resist rollers 133 through a plurality of paper-sheet guides.

A fuser unit 123, a paper-ejection guide 124, paper-ejection rollers 125, and a paper stack 126 are provided above the second transfer belt 113.

A container unit 127 for accommodating replenishment toner is provided between the first transfer belt 107 and the paper stack 126. The toner is four colors, i.e., M, C, Y, and K, and is provided in cartridges 128. The toner of four colors is supplied to the development unit 103 of a respective color by a powder pump or the like.

A frame 129 forming part of the copier machine is configured such that it can be opened through rotation around an open/close support shaft 130. With this arrangement, the travel path of the paper sheet 120 can be openly exposed to make it easier to handle a jammed sheet.

In the following, the operation of each unit of the color printer 100 at the time of duplex printing will be described.

The photoconductive drums 101 form images first.

Namely, through the operation of the exposure unit 106, laser light (light information) emitted from the LD light source for an M color (i.e., for the purpose of forming a toner image of the M color) passes through optical-system components (not shown) to reach the surface of the photoconductive drum 101M of the image forming unit for the M color among the photoconductive drums 101 that have the surfaces thereof evenly charged by the respective charging units 102. A latent image responsive to M-image data (i.e., write information for the M color) is then written (formed) on this surface.

The latent image formed on the surface of the photoconductive drum 101M is developed by the development unit 103 for the M color, so that a visible image (toner image) made of M-color toner is formed and kept on the surface of the photoconductive drum 101M. The M-color toner image is transferred by the first transfer roller 111 to the surface of the first transfer belt 107, which moves in synchronism with the photoconductive drum 101M.

After the transfer, the surface of the photoconductive drum 101M is cleaned by the cleaning unit 104 to remove remaining toner, and is discharged by the discharging unit 105 as preparation for the next image-forming cycle.

The first transfer belt 107 holds the M-color toner image transferred onto the surface thereof, and moves in the direction indicated by the arrow.

The laser light emitted from the LD light source for the C color in the exposure unit 106 reaches the surface of the photoconductive drum 101C of the image forming unit for the C color, and creates a latent image responsive to C-image data on the above-noted surface. The latent image is then developed by the development unit 103 for the C color to form a C-color toner image on the surface of the photoconductive drum 101C.

The C-color toner image is then superimposed on the single-M-color toner image already formed on the first transfer belt 107.

Thereafter, similar image forming processes to those described above are performed to form Y-color and K-color toner images on the respective surfaces of the photoconductive drums 101Y and 101K, and the Y-color toner image is superimposed on the two-M&C-color toner image on the first transfer belt 107, followed by the K-color toner image being superimposed on the three-M&C&Y-color toner image on the first transfer belt 107, thereby forming a full-color (four-color) toner image. It should be noted that a single-color (e.g., K) toner image alone may be formed in some cases.

The second transfer belt 113 is moving in the direction indicated by an arrow in synchronization, so that the toner image formed on the surface of the first transfer belt 107 is transferred onto the surface of the second transfer belt 113 by the function of the second transfer roller 117. In this manner, toner images are formed on the four respective photoconductive drums 101 arranged in tandem, and the forming of an output image proceeds as the first and second transfer belts 107 and 113 move. This arrangement can reduce the time required for the image formation.

When the first transfer belt 107 moves to a predetermined position, a toner image to be formed on the other surface of the paper sheet 120 is formed on the photoconductive drums 101 through operations as described above, and the supply of a paper sheet starts.

As the sheet-feeder roller 131 or 132 rotates counterclockwise, the paper sheet 120 placed on the top of the stack in the sheet-feeder cassette 121 or 122 is pulled out for provision to the resist rollers 133.

The paper sheet 120 is supplied to the position between the first transfer belt 107 and the second transfer belt 113 after passing through the resist rollers 133, and the toner image on the first transfer belt 107 is transferred to one surface of the paper sheet 120 by the second transfer roller 117.

The paper sheet having the toner image transferred onto one surface thereof is conveyed upward in FIG. 2, and the toner image on the second transfer belt 113 is transferred onto the other surface of the paper sheet by the transfer charger 119. When this transfer happens, the conveyance of the paper sheet is performed while checking the timing such that the toner image is positioned correctly.

In this embodiment, the polarity of the toner images formed on the photoconductive drums 101 is minus. Accordingly, positive charge is given to the first transfer roller 111 so as to transfer the toner images formed on the photoconductive drums 101 to the first transfer belt 107. Further, positive charge is given to the second transfer roller 117 so as to transfer the toner images transferred onto the first transfer belt 107 to the second transfer belt 113. A paper sheet is supplied to the position between the first transfer belt 107 and the second transfer belt 113, and positive charge is given to the second transfer roller 117, so that the toner image transferred onto the first transfer belt 107 is transferred onto one surface of the paper sheet. With the transfer charger 119 providing positive charge, the toner image of a negative polarity transferred onto the second transfer belt 113 is pulled and transferred onto the other surface of the paper sheet.

The paper sheet having the toner images transferred onto both surfaces thereof as described above is then supplied to the fuser unit 123, where the toner images on the respective surfaces are melted and fused to the sheet. The paper sheet then passes through the paper-ejection guide 124, and is ejected by the paper-ejection rollers 125 onto the paper stack 126 provided on the top of the frame of the copier machine.

When the paper-ejection unit is comprised of the paper-ejection guide 124, the paper-ejection rollers 125, and the paper stack 126 as shown in FIG. 2, the paper sheet is placed on the paper stack 126 with the first surface down, where the first surface has a toner image transferred directly from the first transfer belt 107. In order to arrange printed pages in proper order, thus, a toner image for the second page needs to be created first for transfer from the first transfer belt 107 to the second transfer belt 113, and a toner image for the first page is created next for direct transfer from the first transfer belt 107 to the paper sheet.

Further, the toner image to be directly transferred from the first transfer belt 107 to the paper sheet is exposed as a non-reversed image on the surface of the photoconductive drums 101 while the toner image to be transferred from the second transfer belt 113 to the paper sheet is exposed as a reversed image (mirror image) on the surface of the photoconductive drums 101.

Such image processes for controlling the order of formed images for proper page arrangement and controlling the placement of images in a non-reversed or reversed position are performed by controlling the writing and reading of image data to and from the memory MEM by the IMAC, which will later be described.

After transfer from the second transfer belt 113 to the paper sheet, the cleaning apparatus 118 including a brush roller, a collecting roller, a blade, and the like removes needless toner and paper powder remaining on the second transfer belt 113.

In FIG. 2, the brush roller of the cleaning apparatus 118 is illustrated as being detached from the surface of the second transfer belt 113. The brush roller of the cleaning apparatus 118 is operable to exhibit swinging motion around a support point 118a, and is operable to come in contact with the surface of the second transfer belt 113. When the second transfer belt 113 still has a toner image before the transfer thereof to a paper sheet, the brush roller is detached from the surface of the second transfer belt 113. When cleaning is necessary, the brush roller is swung counterclockwise to come in contact with the surface of the second transfer belt 113. With this arrangement, needless toner and paper powder remaining on the second transfer belt 113 are removed and collected in a toner collecting unit 134.

The process described above serves to form images in a duplex print mode in which "duplex transfer mode" is set. This image forming process is always performed when performing a duplex printing.

In the case of simplex printing, there are two different modes, i.e., "simplex transfer mode by the second transfer belt 113" and "simplex transfer mode by the first transfer belt 107". If the "simplex transfer mode by the second transfer belt 113" is selected, a toner image formed by superimposing four colors (or formed in a single black color) on the first transfer belt 107 is first transferred onto the second transfer belt 113, and, then, is transferred onto one surface of a paper sheet. The other surface of the paper sheet does not receive any toner image transferred thereto. In this case, the upper surface of a printed paper sheet ejected onto the paper stack 126 bears a printed image. If the "simplex transfer mode by the first transfer belt 107" is selected, a toner image formed by superimposing four colors (or formed in a single black color) on the first transfer belt 107 is directly transferred onto one surface of a paper sheet, without having been transferred to the second transfer belt 113. The other surface of the paper sheet does not receive any toner image transferred thereto. In this case, the under surface of a printed paper sheet ejected onto the paper stack 126 bears a printed image.

Figure 3:
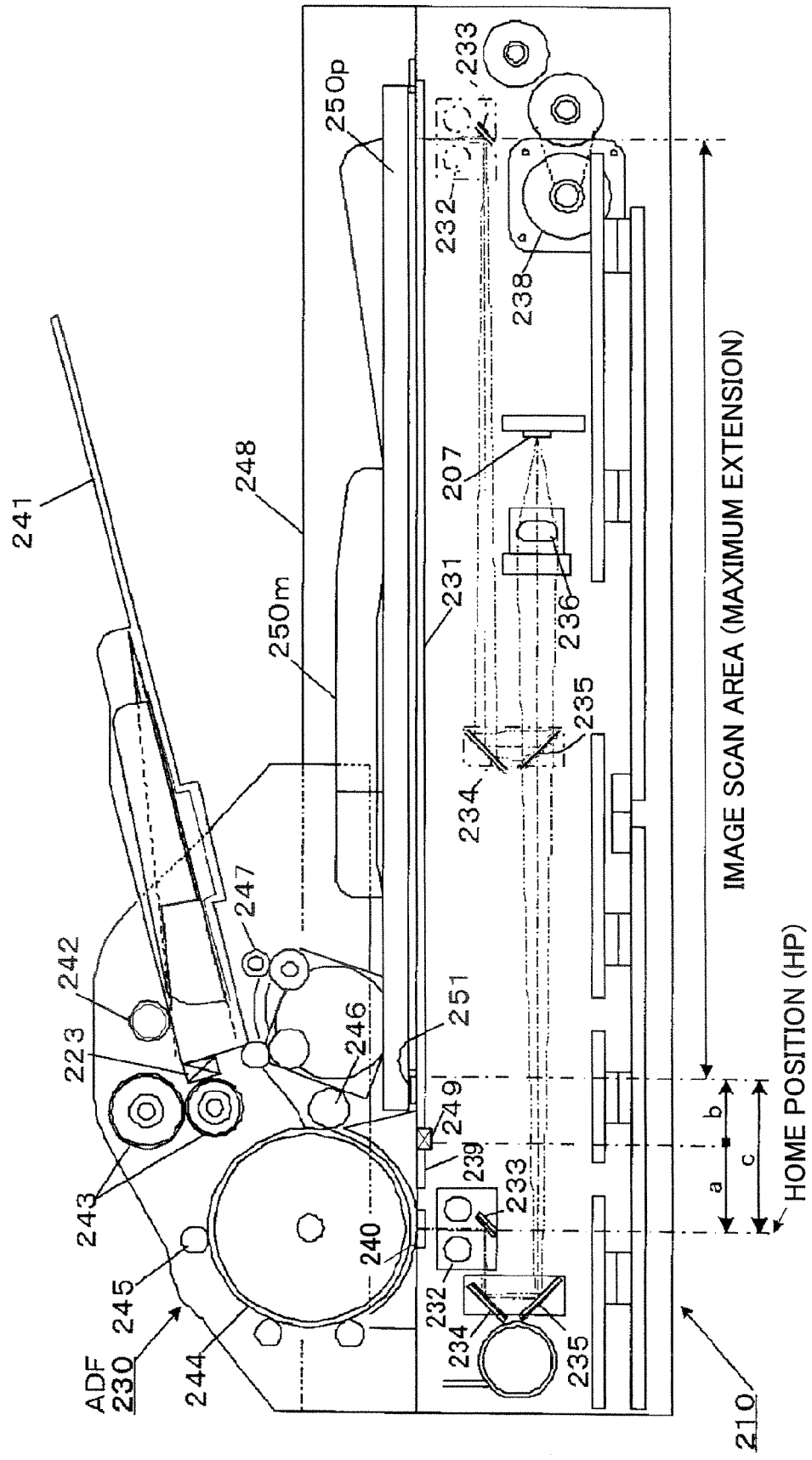
FIG. 3 is a drawing showing an example of the configuration of a document image scan mechanism of a color scanner and auto document feeder shown in FIG. 1.

FIG. 3 is a drawing showing an example of the configuration of a document image scan mechanism of the color scanner 210 and the auto document feeder 230 shown in FIG. 1.

An image bearing surface of a document placed on a contact glass 231 of the color scanner 210 is illuminated by an illumination lump 232, and reflective light (image light) from the image bearing surface is reflected by a first mirror 233 to travel in parallel to the sub-scan direction in which the first mirror 233 travels. The illumination lump 232 and the first mirror 233 are mounted on a first carriage (not shown), which is moved at constant speed in the sub-scan direction.

A second carriage (not shown) that is moved in the same direction at half the speed of the first carriage has a second mirror 234 and a third mirror 235 mounted thereon. The image light reflected by the first mirror 233 is reflected downward by the second mirror 234, and is further reflected by the third mirror 235 to travel in the sub-scan direction, followed by being converged by a lens 236 to be shone on the CCD 207, where the light is converted into electrical signals.

The first and second carriages are driven by a drive motor 238 serving as a drive power source to run in the sub-scan direction to move along an outbound path to scan the document and along a return path.

In this manner, the color scanner 210 is a flatbed-type document scanner that projects a document image onto the CCD 207 by scanning the document on the contact glass 231 by use of the illumination lump 232 and the first mirror 233. In order to also enable a sheet-through scan, a scan glass 240 serving as a sheet-through scan window is provided at the position that is in the sight of the first mirror 233 when the first carriage rests at its home position (standby position) HP. The auto document feeder 230 is situated directly above the scan glass 240, and a conveyer drum 244 of the auto document feeder 230 is opposed to the scan glass 240.

The document sheets stacked on a document tray 241 of the auto document feeder 230 are supplied one by one to the position between the conveyer drum 244 and an urging roller 245 by a pickup roller 242 and a pair of resist rollers 243, and are stuck to the conveyer drum 244 to pass over the scan glass 240, followed by being ejected by paper-ejection rollers 246 and 247 onto a paper tray on a pressure board 250p under the document tray 241.

An image on the under surface of a document sheet is illuminated by the illumination lump 232 that has moved to the position directly below the scan glass 240 when the document sheet passes through the scan glass 240. The light reflected from the document surface is directed to the CCD 207 through the optical system including the first mirror 233, and is subjected to photoelectric conversion. Namely, conversion into image signals corresponding to R, G, and B colors is performed.

The surface of the conveyer drum 244 is a white board that faces the scan glass 240, and is white so as to serve as a white reference surface.

A white reference plate 239 and a reference point sensor 249 for detecting the first carriage are provided between the scan glass 240 and a positioning scale 251 for helping to position the edge of a document sheet. The white reference plate 239 is provided for the purpose of correcting the fluctuation of scanned image data (i.e., shading correction), which occurs due to variation in the light intensity of each of the illumination lump 232, variation in the sub-scan direction, variation in the pixel-by-pixel sensitivity of the CCD 207, etc., despite the fact that a document having an even gray tone is scanned.

A base frame 248 of the auto document feeder 230 is connected through hinges to the base frame of the color scanner 210 on the far side. A user may hold a handle 250*m* provided on the near side of the base frame 248 to lift the base frame 248 of the auto document feeder 230 to open the auto document feeder 230. On the far side of the base frame 248 of the auto document feeder 230 is provided a switch that controls the opening/closing of the auto document feeder 230. The pressure board 250*p* opposed to the contact glass 231 of the auto document feeder 230 is attached to the bottom of the auto document feeder 230. When the auto document feeder 230 is closed, the bottom surface of the pressure board 250*p* comes in close contact with the upper surface of the contact glass 231 as shown in FIG. 3.

Figure 4:
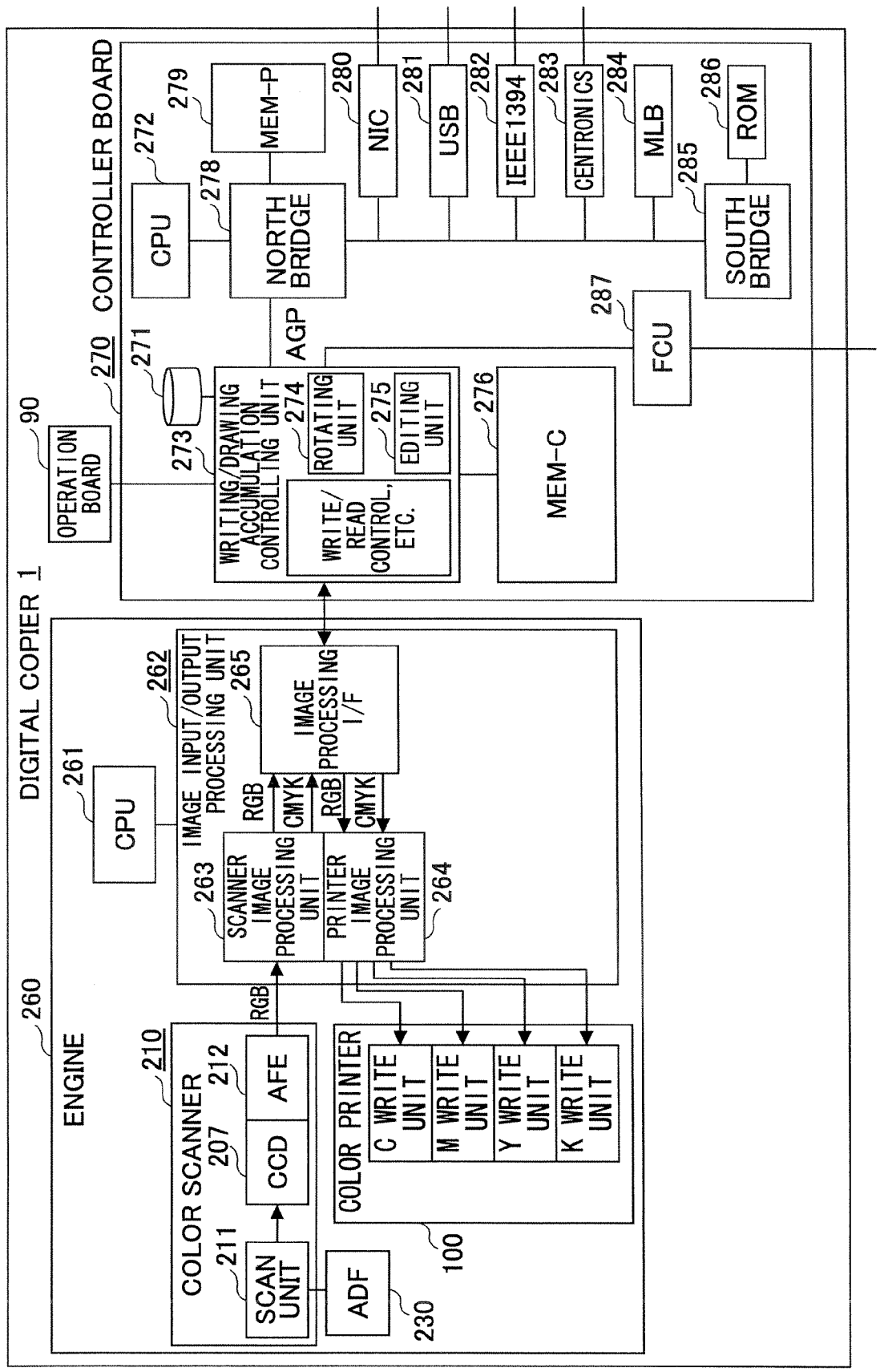
FIG. 4 is a drawing showing an example of the configuration of a control unit of the digital copier shown in FIG. 1.

FIG. 4 is a drawing showing an example of the configuration of a control unit of the digital copier 1 shown in FIG. 1.

The digital copier 1 includes an engine 260 for scanning a document image and performing color printing, a controller board 270, and the operation board 90. The engine 260 includes a CPU 261 for controlling the processes of scanning and printing a document image, the color scanner 210, the color printer 100, and an image input/output processing unit 262 implemented as an ASIC (application specific IC).

The sensor board unit SBU of the color scanner 210 has a CPU, ROM, and RAM (not shown) mounted thereon. This CPU loads programs stored in the ROM to the RAM, and executes these programs to control the entirety of the color scanner 210. The CPU is also connected via communication lines to the CPU 261 for process control, and performs operations as instructed by exchanged commands and data. The CPU of the color scanner 210 controls the sensing operation and ON/OFF control of a document detection sensor, an HP sensor, a pressure-board closing/opening sensor, a cooling fan, and the like. In the color scanner 210, a scanner motor driver is driven by the PWM (pulse width modulation) output of the CPU to generate an excitation pulse sequence to drive a pulse motor for performing a document scan.

The document image is illuminated by light output from the illumination lump (halogen lump) 232 activated by a lump regulator. Reflective light (optical signal) from the document image surface travels through mirrors and lenses to be focused on the CCD (three-line CCD) 207, which includes three line sensors (having respective spectral sensitivity characteristics) for respective color scans (scanning of pixels for the R, G, and B colors). The CCD 207 receives drive clock pulses from the CPU provided on the sensor board unit SBU, and supplies analog image signals corresponding to R, G, and B pixels to an AFE (analog front end) 212 that performs analog signal processing and A/D conversion.

A controller board 270 includes a hard-drive unit (HDD) 271, a CPU 272, a writing/drawing accumulation controlling unit 273 implemented as an ASIC, a local memory (MEM-C) 276, a north bridge (NB) 278, a system memory (MEM-P) 279, an NIC (network interface card) 280, a USB device 281, an IEEE1394 device 282, a Centronics device 283, an MLB 284, and a south bridge (SB) 285.

The operation board 90 is connected to the writing/drawing accumulation controlling unit 273 of the controller board 270 The facsimile control unit (FCU) 287 is also connected to the writing/drawing accumulation controlling unit 273 via a PCI bus.

The CPU 272 serves to exchange writing/drawing data via the NIC 280 with a personal computer PC connected to a network such as a LAN or with another computer connected through the Internet. The USB device 281, the IEEE1394 device 282, or the Centronics device 283 may be used to communicate with a personal computer, a printer, a digital camera, etc.

The SB 285, the NIC 280, the USB device 281, the IEEE1394 device 282, the Centronics device 283, and the MLB 284 are connected to the NB 278 via the PCI bus.

The MLB 284 is a circuit board that is connected to the engine 260 via the PCI bus. The MLB 284 converts writing/drawing data input from an external source into image data, which is then supplied to the engine 260.

The writing/drawing accumulation controlling unit 273 of the controller board 270 is connected to the local memory 276, the HDD 122, etc. Further, the writing/drawing accumulation controlling unit 273 and the CPU 272 are connected to each other via the NB 278 of a CPU chip set. The writing/drawing accumulation controlling unit 273 and the NB 278 are connected to each other via an AGP (Accelerated Graphics Port).

The CPU 272 serves to perform the overall control of the digital copier 1.

The NB 278 is the bridge that connects the CPU 272, the system memory 279, the SB 285, and the writing/drawing accumulation controlling unit 273.

The system memory 279 serves as an image rendering memory or the like in the digital copier 1.

The SB 285 is the bridge that connects the NB 278, the PCI bus, and peripheral devices.

The local memory 276 serves as an image buffer for copying and a code buffer.

The HDD 271 is a storage that stores and keeps various data such as image data, document data, programs, font data, form data, and LUTs (Look Up Tables).

The operation board 90 receives user input operations, and presents information to the user.

FIG. 4 illustrates the flows of image data that are exchanged between the color scanner 210, the color printer 100, and the image input/output processing unit 262.

The image input/output processing unit 262 performs shading correction, scan gamma correction, MTF correction, and so on with respect to the R, G, and B image data obtained through the scanning of a document image by the color scanner 210, and is provided with a scanner image processing unit 263 (scan image correcting apparatus) that converts the corrected R, G, and B image data into M, C, Y, and K image data (recording-color data) according to need.

Further, a printer image processing unit 264 is provided that converts the R, G, and B image data or M, C, Y, and K image data into the M, C, Y, K image data that is suitable for the image print characteristics of the writing units of the color printer 100 corresponding to the respective M, C, Y, and K colors.

Moreover, an image processing I/F (interface circuit) 265 is provided that sends the R, G, and B image data or M, C, Y, and K image data scanned from a document to the writing/drawing accumulation controlling unit 273, and that supplies the R, G, and B image data or M, C, Y, and K image data received from the writing/drawing accumulation controlling unit 273 to the printer image processing unit 264.

When a single-sheet copy process for producing a single printout (image formation) for a single document sheet is to be performed, the M, C, Y, and K image data is supplied from the scanner image processing unit 263 to the image processing I/F 265, and is then output from the image processing I/F 265 to the printer image processing unit 264. The printer image processing unit 264 applies resizing or image processing to the M, C, Y, and K image data supplied from the image processing I/F 265 according to need, and performs a printer-gamma conversion process and gray-scale processing, followed by supplying the processed M, C, Y, and K image data to the write unit (each laser source of the exposure unit 106) of the color printer 100.

When a continuous copy process for producing multiple printouts for a single document sheet is to be performed, the M, C, Y, and K image data is supplied from the scanner image processing unit 263 to the image processing I/F 265, and is then output from the image processing I/F 265 to the writing/drawing accumulation controlling unit 273 for temporal storage in the local memory 276 or the HDD 271. For each copy printout, the image data is retrieved, and is supplied from the writing/drawing accumulation controlling unit 273 to the printer image processing unit 264 via the image processing I/F 265. The printer image processing unit 264 applies resizing or image processing to the M, C, Y, and K image data supplied from the image processing I/F 265 according to need, and performs a printer-gamma conversion process and gray-scale processing, followed by supplying the processed M, C, Y, and K image data to each write unit of the color printer 100.

When a document image scanned by the color scanner 210 is to be registered or transmitted to an external device, the R, G, and B image data output from the scanner image processing unit 263 is registered in the HDD 271 via the image processing I/F 265 and the writing/drawing accumulation controlling unit 273, or is transmitted to the external device after temporal storage in the local memory 276 or in the HDD 271.

When R, G, and B image data registered in the HDD 271 or received from an external device is to be printed to the color printer 100, the image data is supplied to the printer image processing unit 264 via the writing/drawing accumulation controlling unit 273 and the image processing I/F 265. The printer image processing unit 264 converts the M, C, Y, and K image data supplied from the image processing I/F 265 into M, C, Y, and K image data, and applies resizing or image processing according to need, followed by performing a printer-gamma conversion process and gray-scale processing, and then supplying the processed M, C, Y, and K image data to each write unit of the color printer 100.

Figure 5:
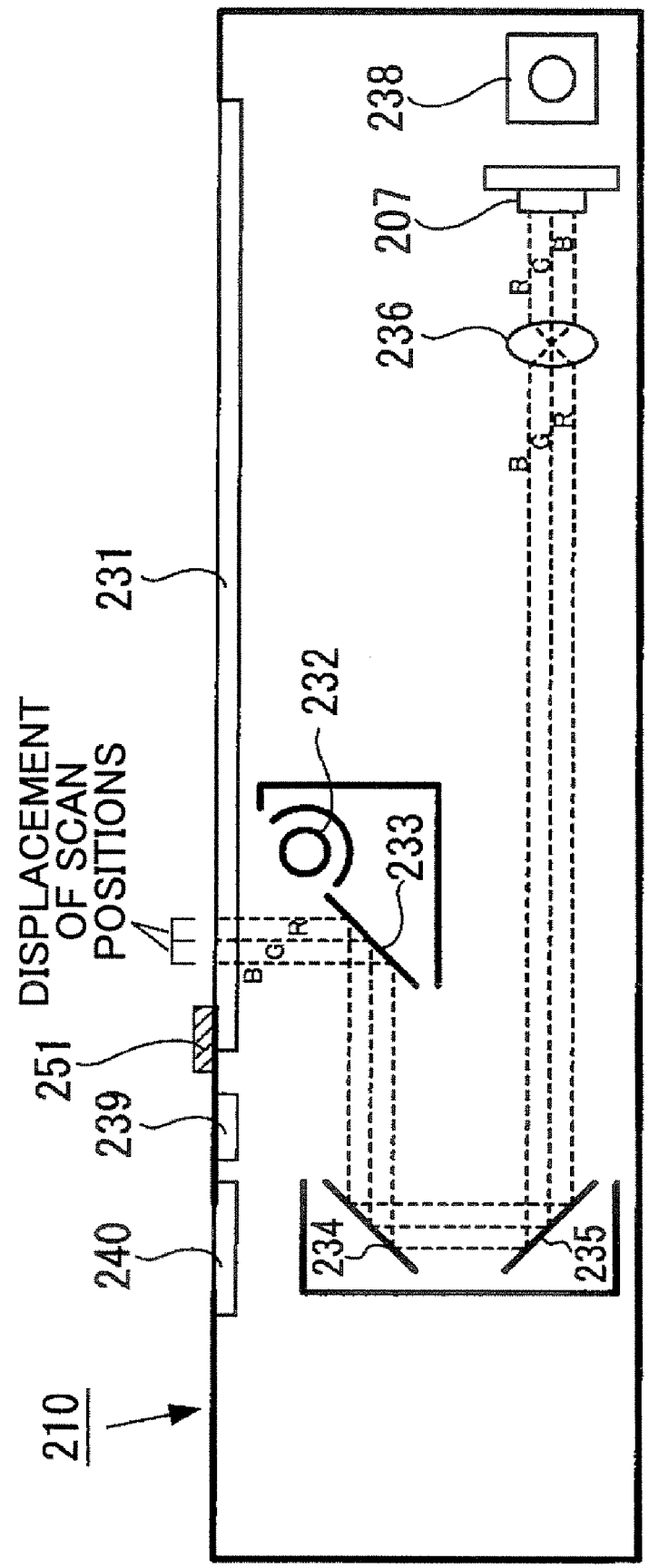
FIG. 5 is a drawing showing image light paths leading to a CCD when an image of the document placed on a contact glass is scanned in the color scanner shown in FIG. 3.

In the following, a description will be given in detail with respect to the AFE 212 and the scanner image processing unit 263 shown in FIG. 4, which are relevant to the present invention. It should be noted that, for the sake of convenience of explanation, the document image scan mechanism of the color scanner 210 is configured as shown in FIG. 5, and an image of the document placed on the contact glass (document platform glass) 231 is scanned in the sub-scan direction (from left to right in FIG. 6) to produce B image data (image data B) as the last data item, so that displacements (to be corrected) between image data R/image data G and the image data B are determined with reference to the image data B. The same applies in the case of a second embodiment, which will later be described.

FIG. 5 is a drawing showing image light paths leading to the CCD 207 when an image of the document placed on the contact glass 231 is scanned in the color scanner 210 shown in FIG. 3.

Figure 6:
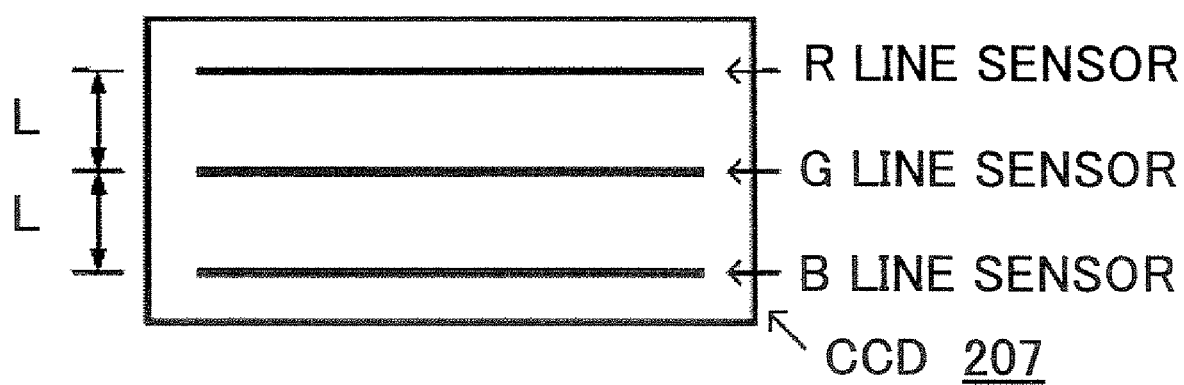
FIG. 6 is a drawing showing an example of the configuration of the color scanner shown in FIG. 3.

FIG. 6 is a drawing showing an example of the configuration of the CCD 207 provided in the color scanner 210 shown in FIG. 3.

The CCD 207 includes three line sensors (scan means) 10*r*, 10*g*, and 10*b*. The line sensors 10*r*, 10*g*, and 10*b* are arranged in the sub-scan direction (line direction) at a predetermined interval L. The plurality of sensor lines of the CCD 207 in which multiple line sensors each extending in the main-scan direction (horizontal direction in FIG. 6) are arranged at the predetermined interval L in the sub-scan direction are used to scan image data. In this case, a document placed on the contact glass 231 is scanned by the illumination lump 232 and the first mirror 233 to project the document image onto the CCD 207, or a sheet conveyed by the auto document feeder 230 is scanned through the scan glass 240 serving as a sheet-through scan window. In this manner, the plurality of sensor lines of the CCD 207 are scanned in the sub-scan direction relative to an object to be scanned, and each of the plurality of sensor lines scans image data at the predetermined line interval in the sub-scan direction. The predetermined line interval is dependent on the scan speed in the sub-scan direction. In the case of the flatbed-type method that scans a document placed on the contact glass 231, for example, the predetermined line interval is dependent on the speed at which the carriage carrying the illumination lump 232 and the first mirror 233 travels.

Figure 7:
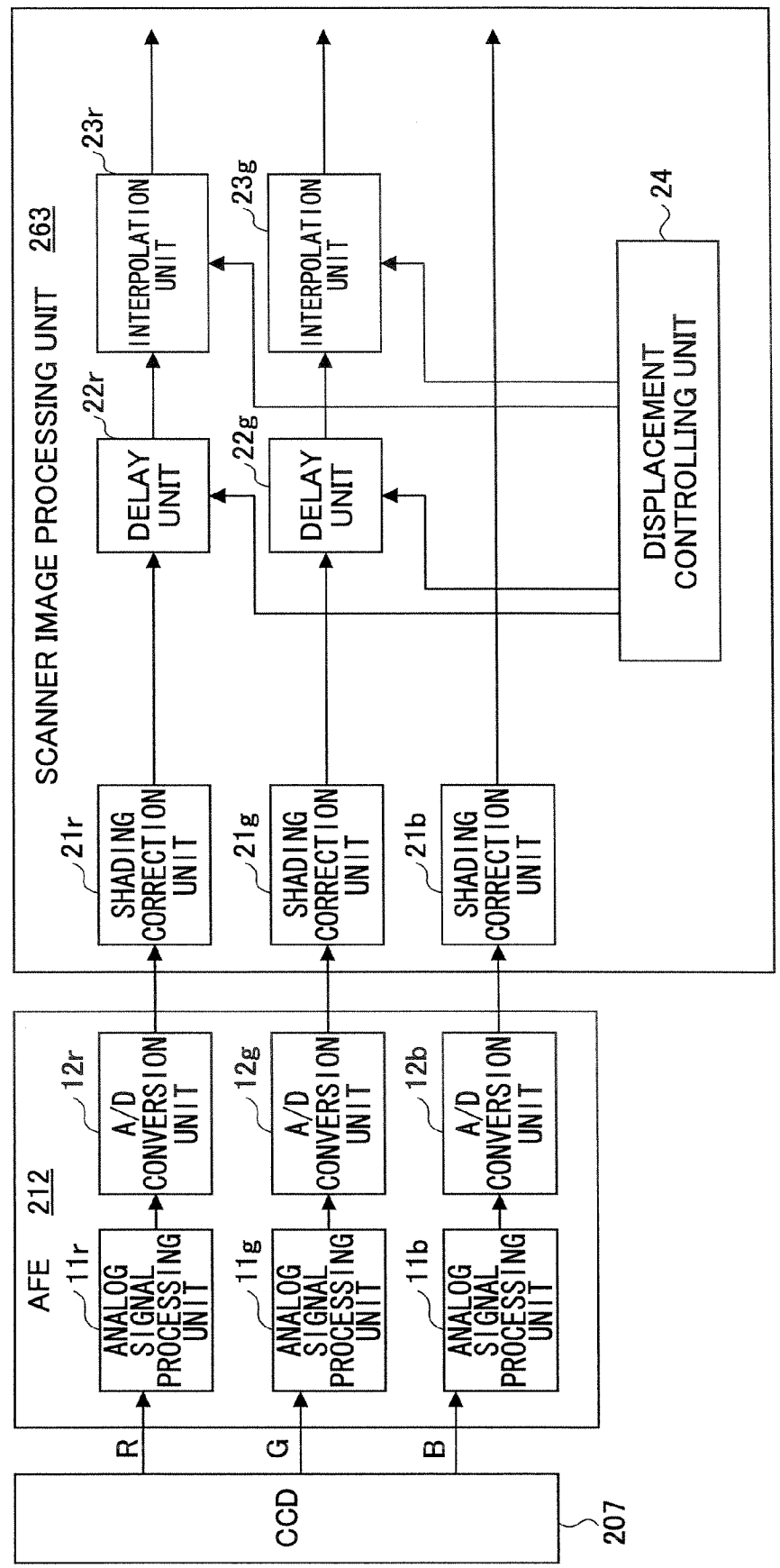
FIG. 7 is a block diagram showing a first example of the configuration of an AFE and scanner image processing unit shown in FIG. 4.

FIG. 7 is a block diagram showing a first example of the configuration of the AFE 212 and the scanner image processing unit 263 shown in FIG. 4.

The AFE 212 includes analog signal processing units 11*r*, 11*g*, and 11*b* and A/D conversion unit 12*r*, 12*g*, and 12*b*.

The analog signal processing unit 11*r* applies processes such as noise removal and amplification to the image data (analog signal) R supplied from the CCD 207.

The analog signal processing unit 11*g* applies processes such as noise removal and amplification to the image data (analog signal) G supplied from the CCD 207.

The analog signal processing unit 11*b* applies processes such as noise removal and amplification to the image data (analog signal) B supplied from the CCD 207.

The A/D conversion unit 12*r* converts the analog signal of the image data R supplied from the analog signal processing unit 11*r* into a digital signal.

The A/D conversion unit 12*g* converts the analog signal of the image data G supplied from the analog signal processing unit 11*g* into a digital signal.

The A/D conversion unit 12*b* converts the analog signal of the image data B supplied from the analog signal processing unit 11*b* into a digital signal.

The scanner image processing unit 263 includes shading correction units 21*r*, 21*g*, and 21*b*, delay units 22*r* and 22*g*, interpolation units 23*r* and 23*g*, and a displacement controlling unit 24. Further, a gamma-correction unit, resizing unit, and filtering unit are provided (not shown).

The shading correction unit 21*r* applies light-fluctuation correction to the image data R supplied from the A/D conversion unit 12*r* of the AFE 212.

The shading correction unit 21*g* applies light-fluctuation correction to the image data G supplied from the A/D conversion unit 12*g* of the AFE 212.

The shading correction unit 21*b* applies light-fluctuation correction to the image data B supplied from the A/D conversion unit 12*b* of the AFE 212.

The delay units 22*r* and 22*g* and the interpolation units 23*r* and 23*g* correct displacements between R, G, and B image data resulting from the arrangement of the line sensors 10*r*, 10*g*, and 10*b* of the CCD 207 (see FIG. 6). This correction process will later be described in detail.

The displacement controlling unit (control unit) 24 supplies signals indicative of a data delay amount and an interpolation amount to the delay units 22*r* and 22*g* and the interpolation units 23*r* and 23*g*, respectively.

Figure 8:
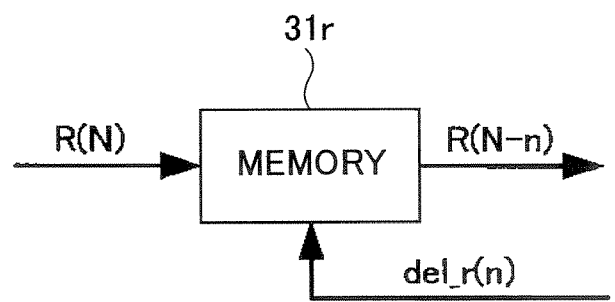
FIG. 8 is a drawing showing an example of the configuration of a delay unit 22 shown in FIG. 7.

FIG. 8 is a drawing showing an example of the configuration of the delay unit 22*r* shown in FIG. 7.

The delay unit 22*r* includes a memory 31*r* for temporarily storing input image data R(N).

When a delay-amount setting signal del(n) from the displacement controlling unit 24 indicates a delay amount n, the memory 31r responds to this delay-amount setting signal by outputting, to the interpolation unit 23r, image data R(N-n) which is the image data R of the n-th preceding line.

The delay unit 22g has the same configuration as the delay unit 22r, and a description thereof will be omitted.

Figure 9:
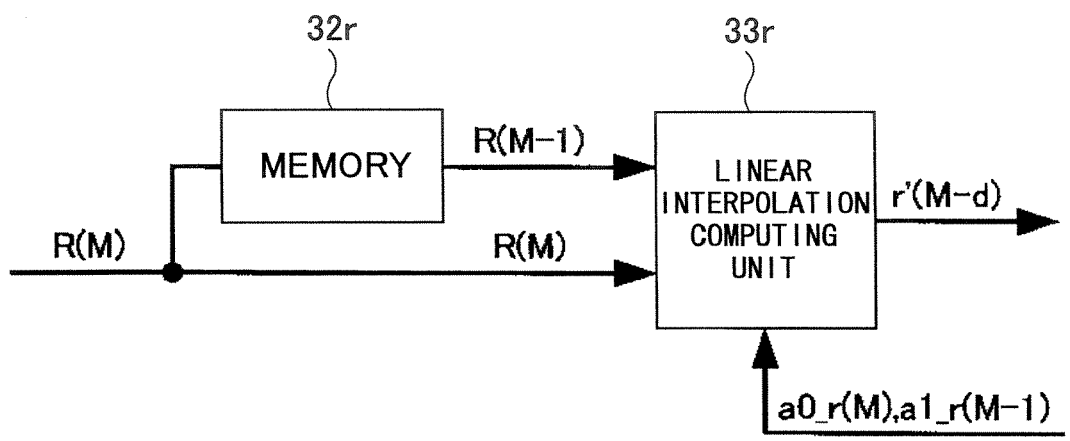
FIG. 9 is a block diagram showing an example of the configuration of an interpolation unit shown in FIG. 7.

FIG. 9 is a block diagram showing an example of the configuration of the interpolation unit 23r shown in FIG. 7.

The interpolation unit 23r includes a memory 32r for temporarily storing input image data R(M) and a linear interpolation computing unit 33r for performing a linear interpolation.

The memory 32r stores image data for one line, and supplies image data R(M-1) of the preceding line to the linear interpolation computing unit 33r.

The linear interpolation computing unit 33r generates linearly interpolated data r' (M-d) based on the input image data R(M), the image data R(M-1) of the preceding line having been delayed by the memory 32r, and interpolation coefficients a0_r(M) and a1_r(M-1).

Figure 10:
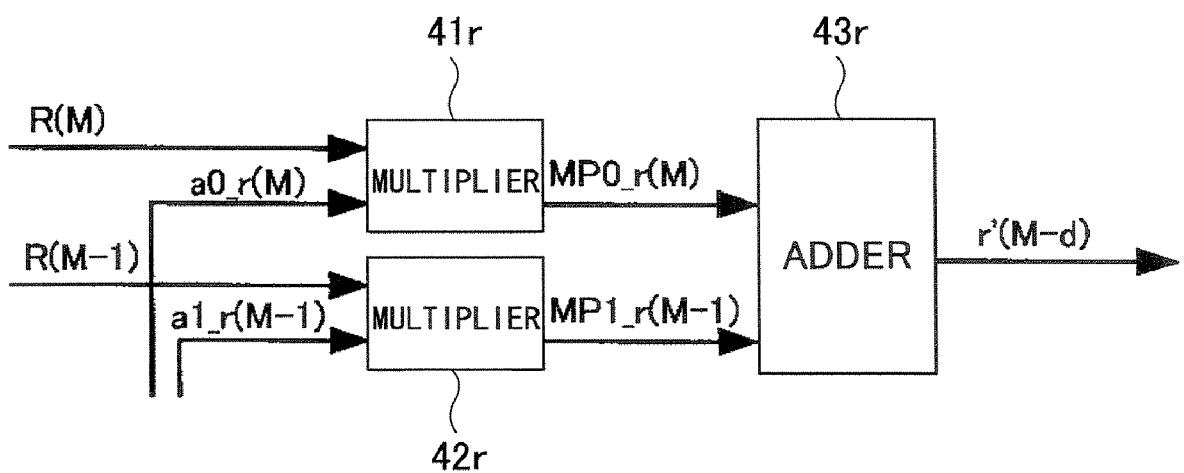
FIG. 10 is a drawing showing an example of the configuration of a linear interpolation computing unit shown in FIG.

FIG. 10 is a drawing showing an example of the configuration of the linear interpolation computing unit 33r shown in FIG. 9.

The linear interpolation computing unit 33r includes multipliers 41r and 42r and an adder 43r.

The multiplier 41r multiplies the input image data R(M) by the interpolation coefficient a0_r(M), and supplies an obtained product MP0_r(M) to the adder 43r.

The multiplier 42r multiplies the input image data R(M-1) by the interpolation coefficient a1_r(M-1), and supplies an obtained product MP1_r(M-1) to the adder 43r.

The adder 43r adds the product MP0_r(M) obtained by the multiplier 41r to the product MP1_r(M-1) obtained by the multiplier 42r, and outputs the obtained sum as linearly interpolated data r' (M-d).

The linearly interpolated data r' (M-d) is represented by use of a mathematical expression as follows.

$$r'(M-d) = a0\_r(M) \times R(M) + a1\_r(M-1) \times R(M-1)$$

The interpolation unit 23g has the same configuration as the interpolation unit 23r, and a description thereof will be omitted.

Figure 11:
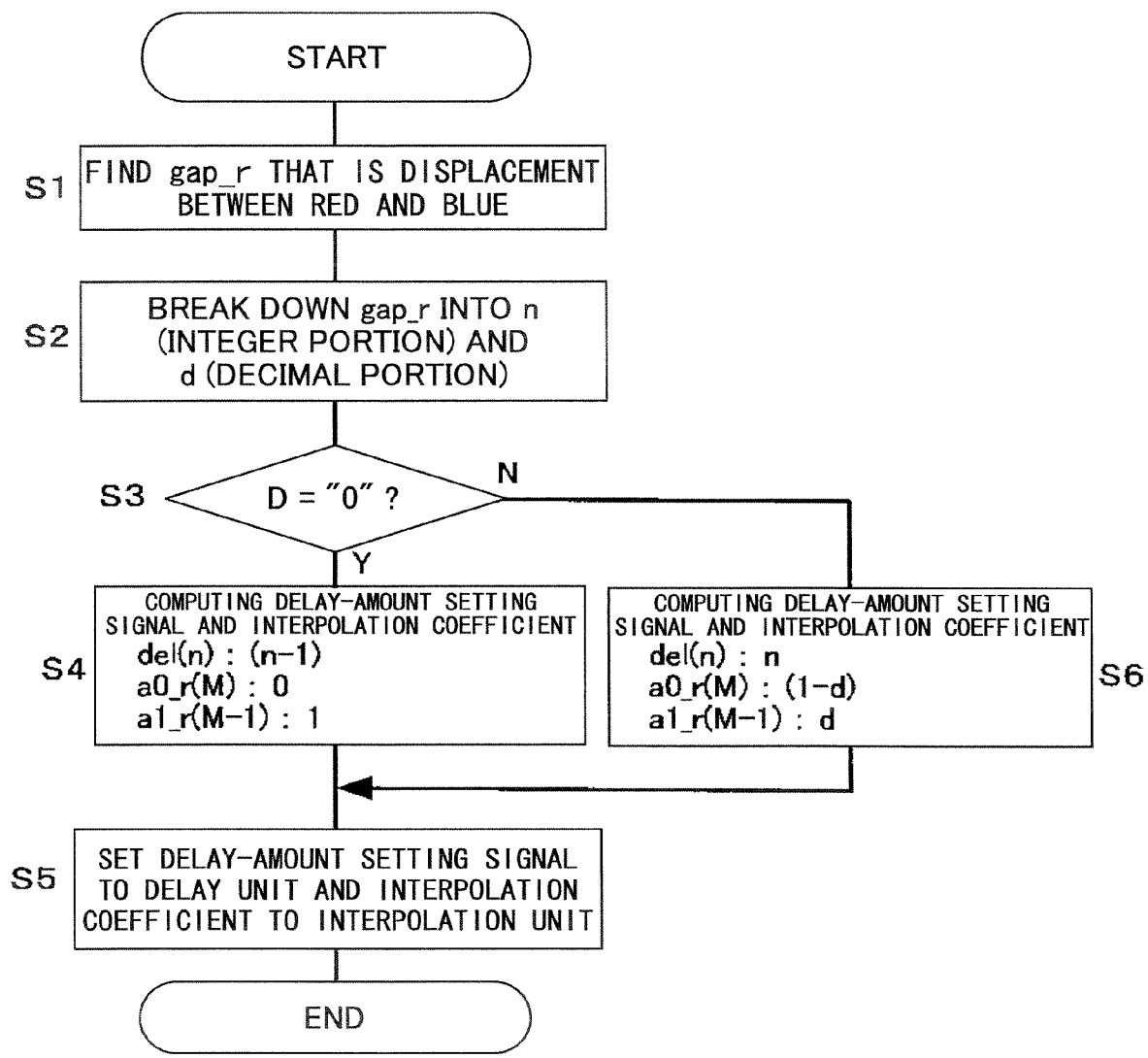
FIG. 11 is a flowchart showing an example of the setting of a delay-amount setting signal and interpolation coefficients by a displacement controlling unit of FIG. 7 with respect to image data R.

FIG. 11 is a flowchart showing an example of the setting of the delay-amount setting signal del(n) and the interpolation coefficients a0_r(M) and a1_r(M-1) by the displacement controlling unit 24 of FIG. 7 with respect to the image data R.

The displacement controlling unit 24 obtains gap_r that indicates a displacement between R(Red) and B(Blue) (i.e., displacement between the image data R and the image data B) at step S1, and breaks down gap_r into an integer portion "n" and a decimal portion "d" at step S2. That is, gap_r=n+d (n: integer, d: real number smaller than 1) This displacement gap_r is dependent on the speed at which the carriage travels in the sub-scan direction.

At step S3, a check is made as to whether the decimal portion "d" of gap_r is "0". If it is not "0", the procedure proceeds to step S6 by ascertaining that the displacement is not equal to an integer multiple of one line.

At step S6, the delay-amount setting signal del_r(n) and the interpolation coefficients a0_r(M) and a1_r(M-1) are computed such that, among the whole displacement, the integer portion "n" is corrected by the delay unit 22r, and the decimal portion "d" is corrected by the interpolation unit 23r. In this case, the delay-amount setting signal del_r(n) indicates the setting of a delay amount n, and the interpolation coefficients a0_r(M) and a1_r(M-1) are "1-d" and "d", respectively.

If the decimal portion "d" of gap_r is "0", the procedure proceeds to step S4 by ascertaining that the displacement is equal to an integer multiple of one line.

At step S4, the delay-amount setting signal del_r(n) and the interpolation coefficients a0_r(M) and a1_r(M-1) are computed such that, among the whole displacement equal to n lines, the displacement for n-1 lines is corrected by the delay unit 22r, and the displacement for the 1 remaining line is corrected by the interpolation unit 23r. In this case, it suffices for the delay-amount setting signal del_r(n) to indicate the correction of displacement for n-1 lines despite the fact that the integer portion of the displacement is n, and, thus, indicates the setting of delay amount n-1. In this case, the interpolation coefficients a0_r(M) and a1_r(M-1) are "0" and "1", respectively. Namely, the interpolation coefficients are set such that interpolation computation becomes equivalent to the computation that produces a 1-line delay.

After the delay-amount setting signal del_r(n) and the interpolation coefficients a0_r(M) and a1_r(M-1) are computed at step S4 or S6, the procedure proceeds to step S5, at which the delay-amount setting signal del_r(n) is supplied to the delay unit 22r, and the interpolation coefficients a0_r(M) and a1_r(M-1) are set in the interpolation unit 23r.

The setting of a delay-amount setting signal del_g(n) and interpolation coefficients a0_g(M) and a1_g(M-1) for the image data G are substantially the same as described above, and a description thereof will be omitted.

Figure 12:
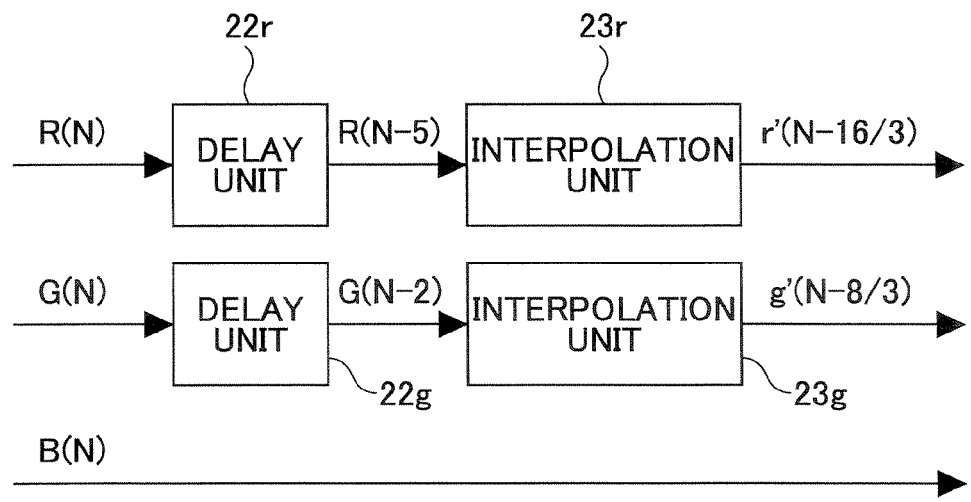
FIG. 12 is a drawing for explaining the operation of delay units and interpolation units of FIG. 7 when the displacement between R and B is 6/3 lines and the displacement between G and B is 8/3 lines.

FIG. 12 is a drawing for explaining the operation of the delay units 22r and 22g and the interpolation units 23r and 23g of FIG. 7 when the displacement between R and B is 16/3 lines and the displacement between G and B is 8/3 lines.

Since the displacement between R and B is 16/3 lines, the integer portion "n" is "5", and the decimal portion "d" is "1/3". In this case, the interpolation coefficients a0_r(M) and a1_r(M-1) are 2/3 and 1/3, respectively.

Accordingly, the delay unit 22r introduces a 5-line delay with respect to the image data R. Further, the interpolation unit 23r performs a linear interpolation computation to obtain image data r' (N-16/3) that corresponds to the position of the 16/3-th line, based on the image data R(N-5) of the fifth preceding line and the image data R(N-6) of the sixth preceding line.

Since the displacement between G and B is 8/3 lines, the integer portion "n" is "2", and the decimal portion "d" is "2/3". In this case, the interpolation coefficients a0_r(M) and a1_r(M-1) are 1/3 and 2/3, respectively.

Accordingly, the delay unit 22g introduces a 2-line delay with respect to the image data G. Further, the interpolation unit 23g performs a linear interpolation computation to obtain image data g' (N-8/3) that corresponds to the position of the 8/3-th line, based on the image data G(N-2) of the second preceding line and the image data G(N-3) of the third preceding line.

Figure 13:
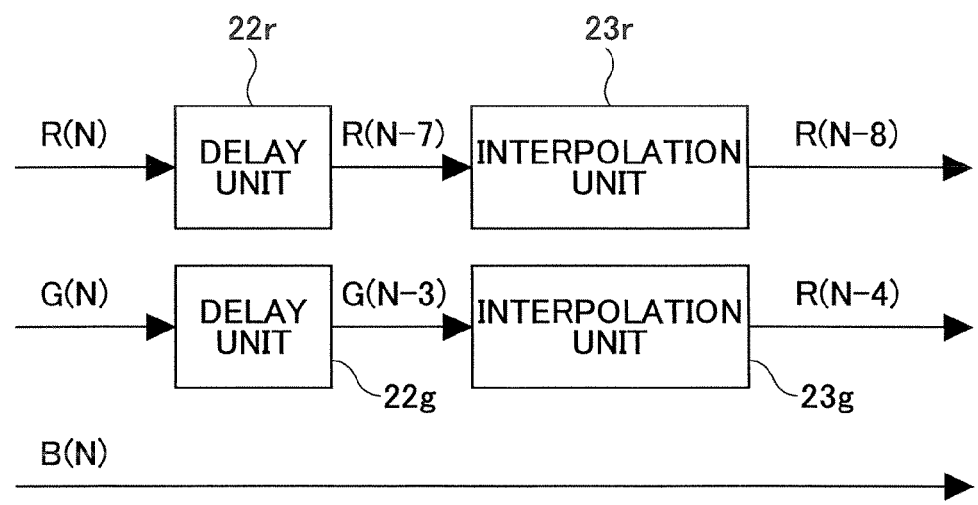
FIG. 13 is a drawing for explaining the operation of the delay units and the interpolation units when the displacement between R and B is 8 lines and the displacement between G and B is 4 lines.

FIG. 13 is a drawing for explaining the operation of the delay units 22r and 22g and the interpolation units 23r and 23g when the displacement between R and B is 8 lines and the displacement between G and B is 4 lines.

Since the displacement between R and B is 8 lines, the decimal portion "d" is "0". Accordingly, the delay-amount setting signal del_r(8) is set to a signal indicative of delay amount "7" despite the fact that the integer portion "n" is 8. In this case, the interpolation coefficients a0_r(M) and a1_r(M-1) are "0" and "1", respectively.

Accordingly, the delay unit 22r introduces a 7-line delay, and the interpolation unit 23r introduces a 1-line delay, with respect to the image data R.

Since the displacement between G and B is 4 lines, the decimal portion "d" is "0". Accordingly, the delay-amount setting signal del_r(4) is set to a signal indicative of delay amount "3" despite the fact that the integer portion "n" is 4. In this case, the interpolation coefficients a0_r(M) and a1_r(M−1) are "0" and "1", respectively.

Accordingly, the delay unit 22g introduces a 3-line delay, and the interpolation unit 23g introduces a 1-line delay, with respect to the image data G.

In the following, the operation of the scanner image processing unit of a related-art image forming apparatus corresponding to the above-described operation of the scanner image processing unit 263 will be described by referring to FIG. 14.

Figure 14:
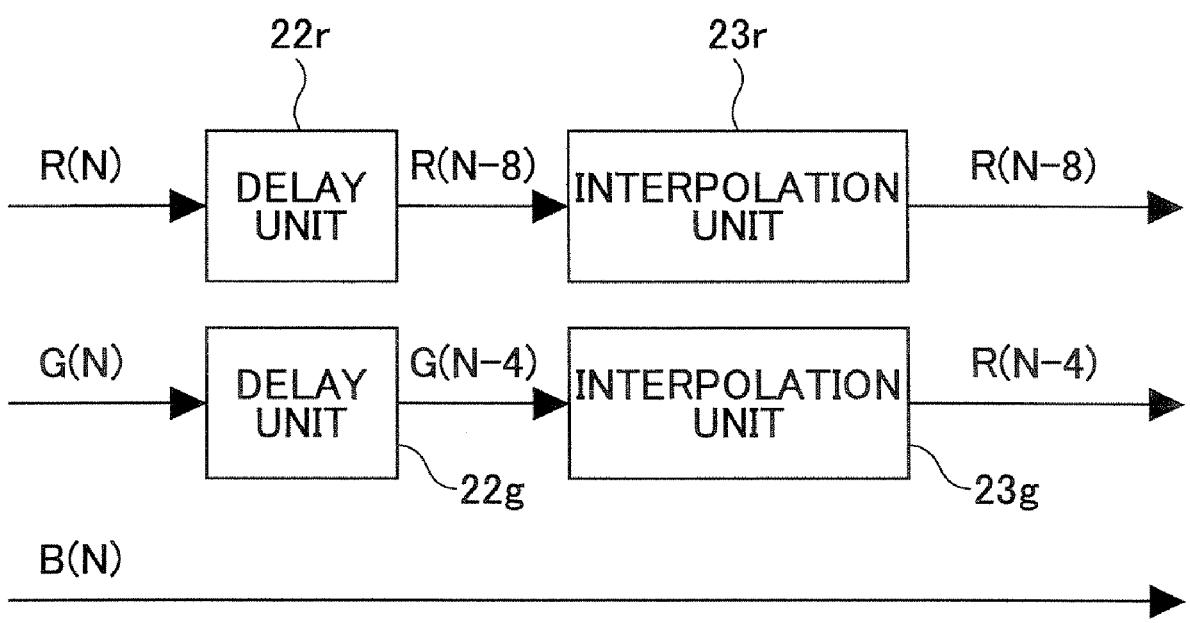
FIG. 14 is a drawing for explaining the operation of the delay units and interpolation units of a related-art image forming apparatus when the displacement between R and B is 8 lines and the displacement between G and B is 4 lines.

FIG. 14 is a drawing for explaining the operation of the delay units and interpolation units of a related-art image forming apparatus when the displacement between R and B is 8 lines and the displacement between G and B is 4 lines. For the same of convenience of explanation, the same reference numerals as those of FIG. 13 are used.

In the related-art configuration, the delay unit 22r introduces an 8-line delay, and the interpolation unit 23r outputs input data as it is, with respect to the image data R. Further, the delay unit 22g introduces a 4-line delay, and the interpolation unit 23g outputs input data as it is, with respect to the image data G.

Accordingly, when a displacement between adjacent line sensors in the sub-scan direction is an integer multiple of one line, the size of the memories 31r and 31g (not shown) of the delay units 22r and 22g required for the image forming apparatus (digital copier) of the first embodiment is one-line less than the memory size required in the related-art image forming apparatus.

If the displacement between R and B is 8 lines and the displacement between G and B is 4 lines, for example, the related-art image forming apparatus needs the memory capacity for storage of data for 8 lines with respect to the memory 31r of the delay unit 22r, and needs the memory capacity for storage of data for 4 lines with respect to the memory 31g of the delay unit 22g.

On the other hand, when the displacement between R and B is 8 lines and the displacement between G and B is 4 lines, the image forming apparatus of the first embodiment only needs the memory capacity for storage of data for 7 lines with respect to the memory 31r of the delay unit 22r, and only needs the memory capacity for storage of data for 3 lines with respect to the memory 31g of the delay unit 22g.

In general, an image scan apparatus is designed such that a displacement between adjacent line sensors in the sub-scan direction is an integer multiple of one line when the travel speed of the carriage is set to such a speed as to scan an image at the maximum resolution (e.g., 600 dpi) among the available resolution settings. Namely, the maximum displacement between adjacent line sensors in the sub-scan direction is generally an integer multiple of one line, so that the size of the memories 31r and 31g of the delay units 22r and 22g required for the image forming apparatus of the first embodiment can be set one-line less than the memory size required in the related-art image forming apparatus.

Second Embodiment

In the following, a description will be given of a second embodiment of an image forming apparatus provided with a scanned image correcting apparatus according to the present invention. The second embodiment differs from the first embodiment only in the configuration of the scanner image processing unit 263, and a description will be given with focus on such difference.

Figure 15:
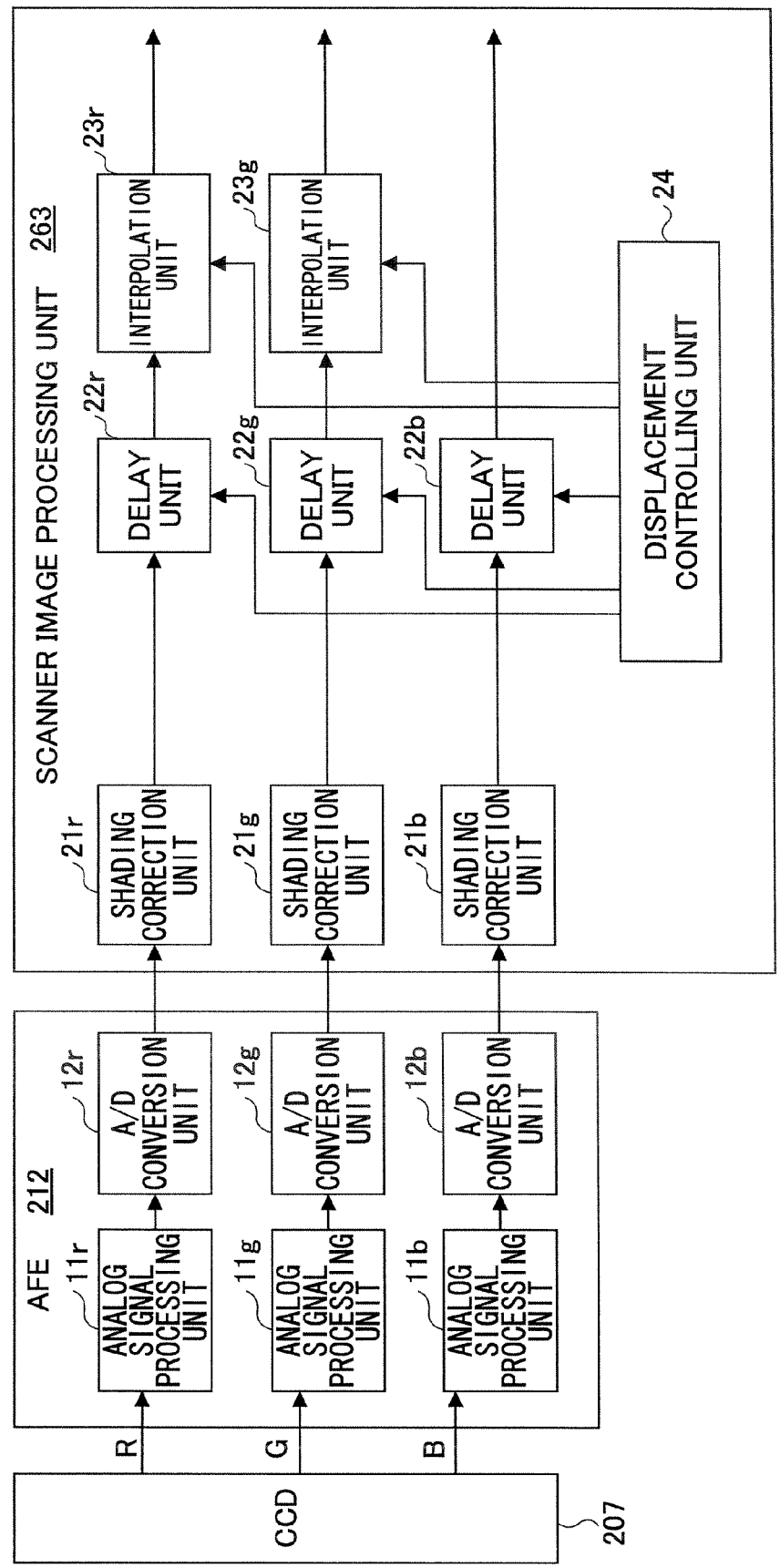
FIG. 15 is a block diagram showing a second example of the configuration of an AFE and scanner image processing unit shown in FIG. 4.

FIG. 15 is a block diagram showing a second example of the configuration of the AFE 212 and the scanner image processing unit 263 shown in FIG. 4. In FIG. 15, the same elements as those of FIG. 7 are referred to by the same numerals.

In the second embodiment, the scanner image processing unit 263 shown in FIG. 15 includes a delay unit 22b for the image data B additionally provided on top of the configuration shown in FIG. 7 (first embodiment). The delay unit 22b will later be described.

Among the units shown in FIG. 15, the CCD 207, the analog signal processing units 11r, 11g, and 11b and A/D conversion units 12r, 12g, and 12b of the AFE 212, and the shading correction units 21r, 21g, and 21b and delay units 22r and 22g of the scanner image processing unit 263 perform the same operations as those shown in FIG. 7 (first embodiment).

Among the units shown in FIG. 15, the delay unit 22b has the same configuration as the delay unit 22r, and delays the image data B by one line. The reason for this is that the interpolation units 23r and 23g introduce a 1-line delay to the image data, so that data needs to be aligned by taking this into account.

Figure 16:
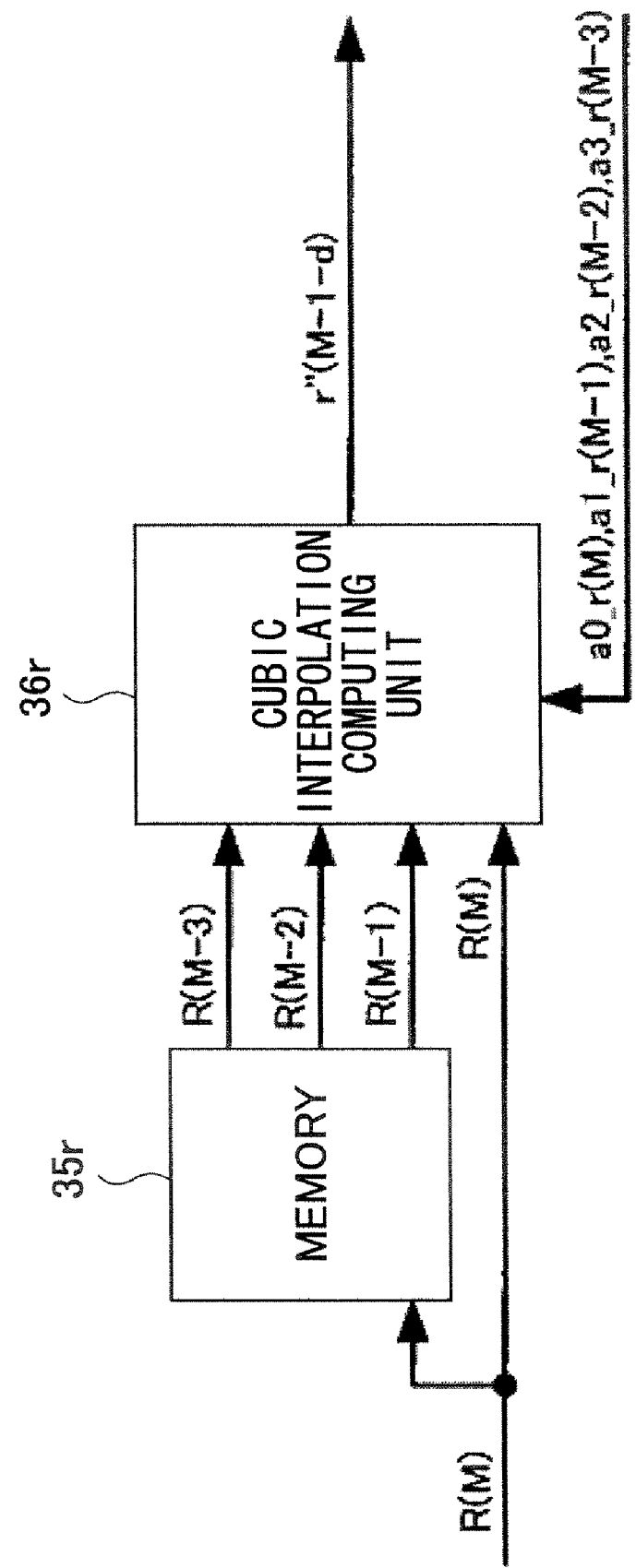
FIG. 16 is a block diagram showing an example of the configuration of an interpolation unit shown in FIG. 15.

FIG. 16 is a block diagram showing an example of the configuration of the interpolation unit 23r shown in FIG. 15.

The interpolation unit 23r includes a memory 35r for temporarily storing input image data R(M) and a cubic interpolation computing unit 36r for performing a cubic interpolation.

The memory 35r stores image data for three line, and supplies image data R(M−1), R(M−2), and R(M−3) of the preceding line, the second preceding line, and the third preceding line, respectively, to the cubic interpolation computing unit 36r.

The cubic interpolation computing unit 36r generates cubically interpolated data r" (M−1−d) based on the input image data R(M), the image data R(M−1), R(M−2), and R(M−3) of the preceding line, the second preceding line, and the third preceding line having been delayed by the memory 35r, and interpolation coefficients a0_r(M), a1_r(M−1), a2_r(M−2), and a3_r(M−3).

Figure 17:
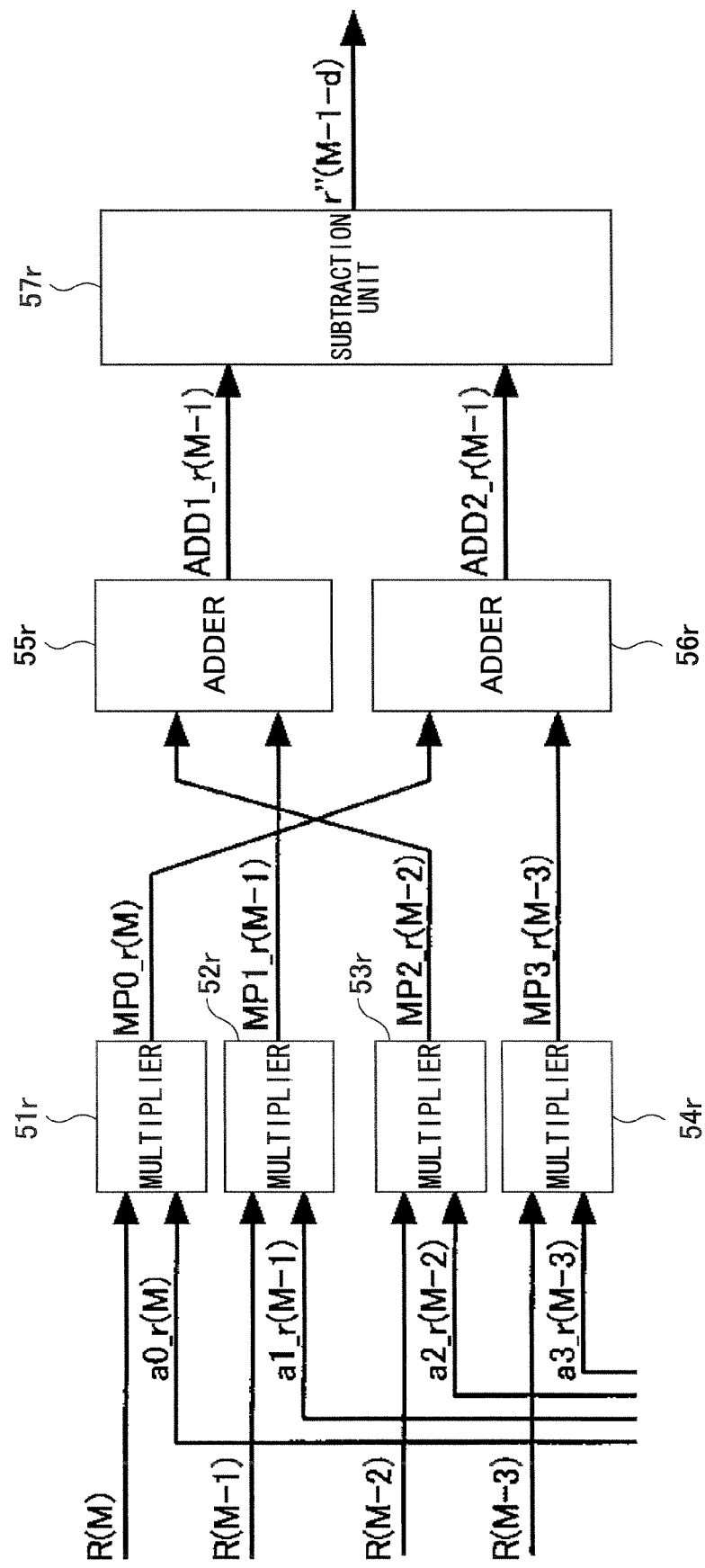
FIG. 17 is a drawing showing an example of the configuration of a cubic interpolation computing unit shown in FIG. 16.

FIG. 17 is a drawing showing an example of the configuration of the cubic interpolation computing unit 36r shown in FIG. 16.

The cubic interpolation computing unit 36r includes multipliers 51r, 52r, 53r, and 54r, adders 55r and 56r, and a subtraction unit 57r.

The multiplier 51r multiplies the input image data R(M) by the interpolation coefficient a0_r(M), and supplies an obtained product MP0_r(M) to the adder 56r.

The multiplier 52r multiplies the input image data R(M−1) by the interpolation coefficient a1_r(M−1), and supplies an obtained product MP1_r(M−1) to the adder 55r.

The multiplier 53r multiplies the input image data R(M−2) by the interpolation coefficient a2_r(M−2), and supplies an obtained product MP2_r(M−2) to the adder 55r.

The multiplier 54r multiplies the input image data R(M−3) by the interpolation coefficient a3_r(M−3), and supplies an obtained product MP3_r(M−3) to the adder 56r.

The adder 55r adds the product MP1_r(M) obtained by the multiplier 52r to the product MP2_r(M−2) obtained by the multiplier 53r, and outputs an obtained sum ADD1_r(M−1).

The adder 56r adds the product MP0_r(M) obtained by the multiplier 51r to the product MP3_r(M−3) obtained by the multiplier 54r, and outputs an obtained sum ADD2_r(M−1).

The subtraction unit 57r subtracts the sum ADD2_r(M−1) obtained by the adder 56r from the sum ADD1_r(M−1) obtained by the adder 55r, and outputs the obtained difference as the cubically interpolated data r" (M−1−d).

The cubically interpolated data r" (M−1−d) is represented by use of a mathematical expression as follows.

r" (M−1−d)=−a0_r (M)×R (M)+a1_r (M−1)×R (M−1)+ a2_r (M−2)×R (M−2)−a3_r (M−3)×R (M−3) Here, the cubically interpolated data is denoted as r" (M−1−d) because the cubic interpolation computing unit 36r introduces a 1-line delay to the image data.

The interpolation unit 23g has the same configuration as the interpolation unit 23r, and a description thereof will be omitted.

Figure 18:
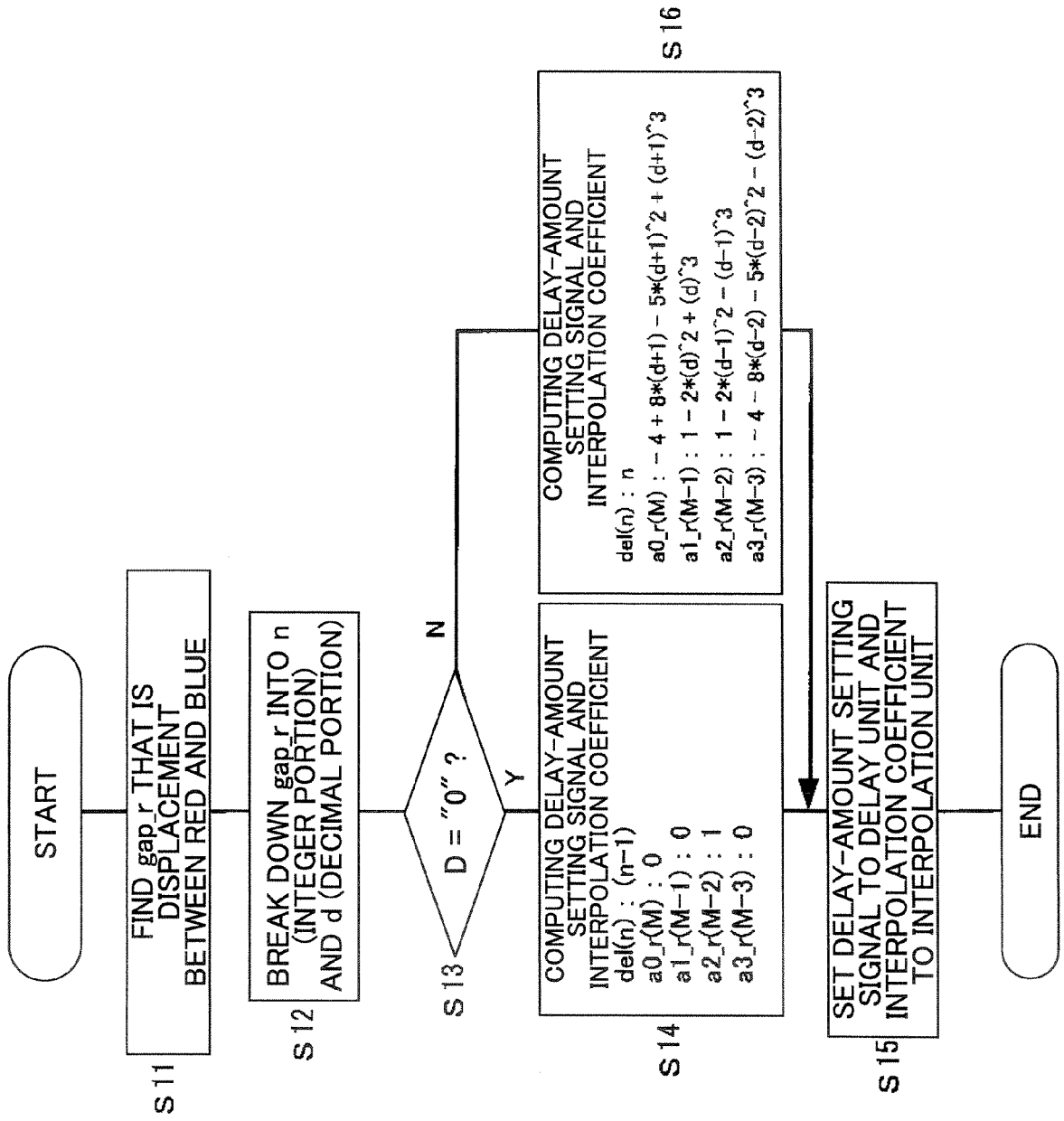
FIG. 18 is a flowchart showing an example of the setting of the delay-amount setting signal and interpolation coefficients by a displacement controlling unit of FIG. 15 with respect to image data R.

FIG. 18 is a flowchart showing an example of the setting of the delay-amount setting signal del(n) and the interpolation coefficients a0_r(M), a1_r(M−1), a2_r(M−2), and a3_r(M−3) by the displacement controlling unit 24 of FIG. 15 with respect to the image data R. In the figure, the symbol "*" represents a multiplication operator, and the symbol "^" represents a power operator.

The displacement controlling unit 24 obtains gap_r that indicates a displacement between R(Red) and B(Blue) (i.e., displacement between the image data R and the image data B) at step S11, and breaks down gap_r into an integer portion "n" and a decimal portion "d" at step S12. That is, gap_r=n+d (n: integer, d: real number smaller than 1) This displacement gap_r is dependent on the speed at which the carriage travels in the sub-scan direction.

At step S13, a check is made as to whether the decimal portion "d" of gap_r is "0". If it is not "0", the procedure proceeds to step S16 by ascertaining that the displacement is not equal to an integer multiple of one line.

At step S16, the delay-amount setting signal del_r(n) and the interpolation coefficients a0_r(M), a1_r(M−1), a2_r(M−2), and a3_r(M−3) are computed such that, among the whole displacement, the integer portion "n" is corrected by the delay unit 22r, and the decimal portion "d" is corrected by the interpolation unit 23r. In this case, the delay-amount setting signal del_r(n) indicates the setting of a delay amount n, and the interpolation coefficients a0_r(M), a1_r(M−1), a2_r(M−2)," and a3_r(M−3) are "−4+8×(d+1)−5×(d+1)$^2$+(d+1)$^3$," "1−2×(d)$^2$+(d)$^3$," "1−2×(d−1)$^2$−(d−1)$^3$," "−4−8×(d−2)−5× (d−2)$^2$−(d−2)$^3$," respectively.

If the decimal portion "d" of gap_r is "0", the procedure proceeds to step S14 by ascertaining that the displacement is equal to an integer multiple of one line.

At step S14, the delay-amount setting signal del_r(n) and the interpolation coefficients a0_r(M), a1_r(M−1), a2_r(M−2), and a3_r(M−3) are computed such that, among the whole displacement equal to n lines, the displacement for n−1 lines is corrected by the delay unit 22r, and the displacement for the 1 remaining line is corrected by the interpolation unit 23r. In this case, it suffices for the delay-amount setting signal del_r (n) to indicate the correction of displacement for n−1 lines despite the fact that the integer portion of the displacement is n, and, thus, indicates the setting of delay amount n−1. In this case, the interpolation coefficients a0_r(M), a1_r(M−1), a2_r (M−2), and a3_r(M−3) are "0", "0", "1" and "0", respectively. Namely, the interpolation coefficients are set such that interpolation computation becomes equivalent to the computation that produces a 2-line delay. In this case, the image data B serving as a reference for positional alignment is delayed by one line by the delay unit 22b as previously described. In substance, therefore, the interpolation coefficients are set such that interpolation computation becomes equivalent to the computation that introduces a 1-line delay. Viewing from a different angle, the fact that the image data serving as a reference for positional alignment is delayed by one line means that there is a displacement equal to n+1 lines in total, where the displacement for n−1 lines is corrected by the delay unit 22r and the displacement for the 2 remaining lines is corrected by the interpolation unit 23r.

After the delay-amount setting signal del_r(n) and the interpolation coefficients a0_r(M), a1_r(M−1), a2_r(M−2), and a3_r(M−3) are computed at step S14 or S16, the procedure proceeds to step S15, at which the delay-amount setting signal del_r(n) is supplied to the delay unit 22r, and the interpolation coefficients a0_r(M), a1_r(M−1), a2_r(M−2), and a3_r(M−3) are set in the interpolation unit 23r.

The setting of a delay-amount setting signal del_g(n) and interpolation coefficients a0_g(M), a1_g(M−1), a2_g(M−2), and a3_g(M−3) for the image data G are substantially the same as described above, and a description thereof will be omitted.

Figure 19:
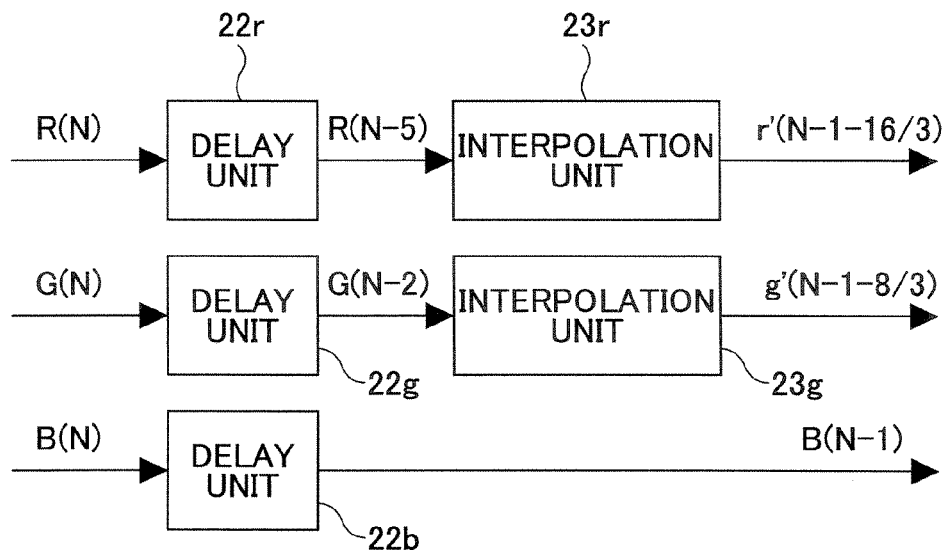
FIG. 19 is a drawing for explaining the operation of the delay units and the interpolation units of FIG. 15 when the displacement between R and B is 16/3 lines and the displacement between G and B is 8/3 lines.

FIG. 19 is a drawing for explaining the operation of the delay units 22r, 22g and 22b and the interpolation units 23r and 23g of FIG. 15 when the displacement between R and B is 16/3 lines and the displacement between G and B is 8/3 lines.

The delay unit 22r introduces a 5-line delay with respect to the image data R. Further, the interpolation unit 23r performs a cubic interpolation computation to obtain image data r' (N−1−16/3) that corresponds to the position of the 1+16/3-th line, based on the image data R(N−5) of the fifth preceding line, the image data R(N−6) of the sixth preceding line, the image data R(N−7) of the seventh preceding line, and the image data R(N−8) of the eight preceding line.

The delay unit 22g introduces a 2-line delay with respect to the image data G. Further, the interpolation unit 23g performs a cubic interpolation computation to obtain image data g' (N−1−8/3) that corresponds to the position of the 1+8/3-th line, based on the image data G(N−2) of the second preceding line, the image data G(N−3) of the third preceding line, the image data G(N−4) of the fourth preceding line, and the image data G(N−5) of the fifth preceding line.

The delay unit 22b introduces a 1-line delay with respect to the image data B.

Figure 20:
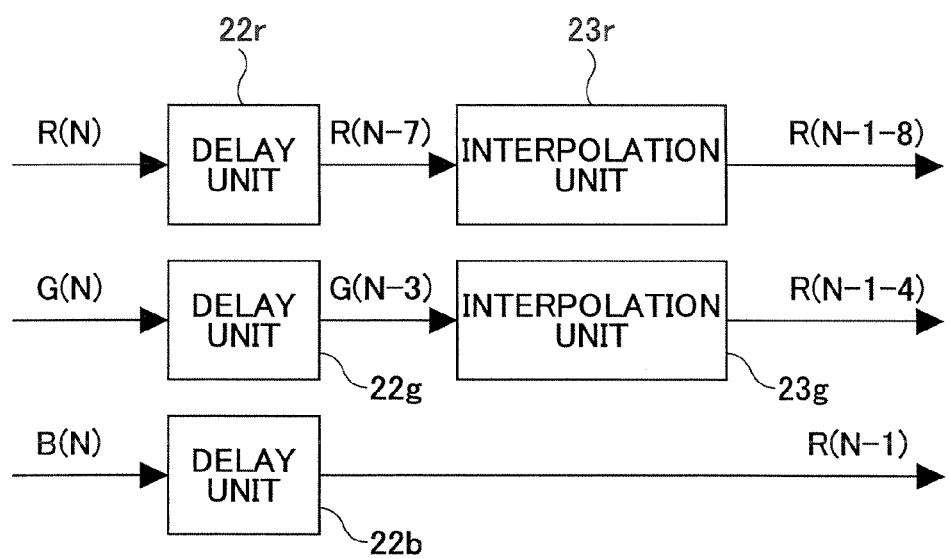
FIG. 20 is a drawing for explaining the operation of the delay units and the interpolation units of FIG. 15 when the displacement between R and B is 8 lines and the displacement between G and B is 4 lines.

FIG. 20 is a drawing for explaining the operation of the delay units 22r, 22g and 22b and the interpolation units 23r and 23g of FIG. 15 when the displacement between R and B is 8 lines and the displacement between G and B is 4 lines.

The delay unit 22r introduces a 7-line delay, and the interpolation unit 23r introduces a 2-line delay, with respect to the image data R.

The delay unit 22g introduces a 3-line delay, and the interpolation unit 23g introduces a 2-line delay, with respect to the image data G.

The delay unit 22b introduces a 1-line delay with respect to the image data B.

In the following, the operation of the scanner image processing unit of a related-art image forming apparatus corresponding to the above-described operation of the scanner image processing unit 263 will be described by referring to FIG. 21.

Figure 21:
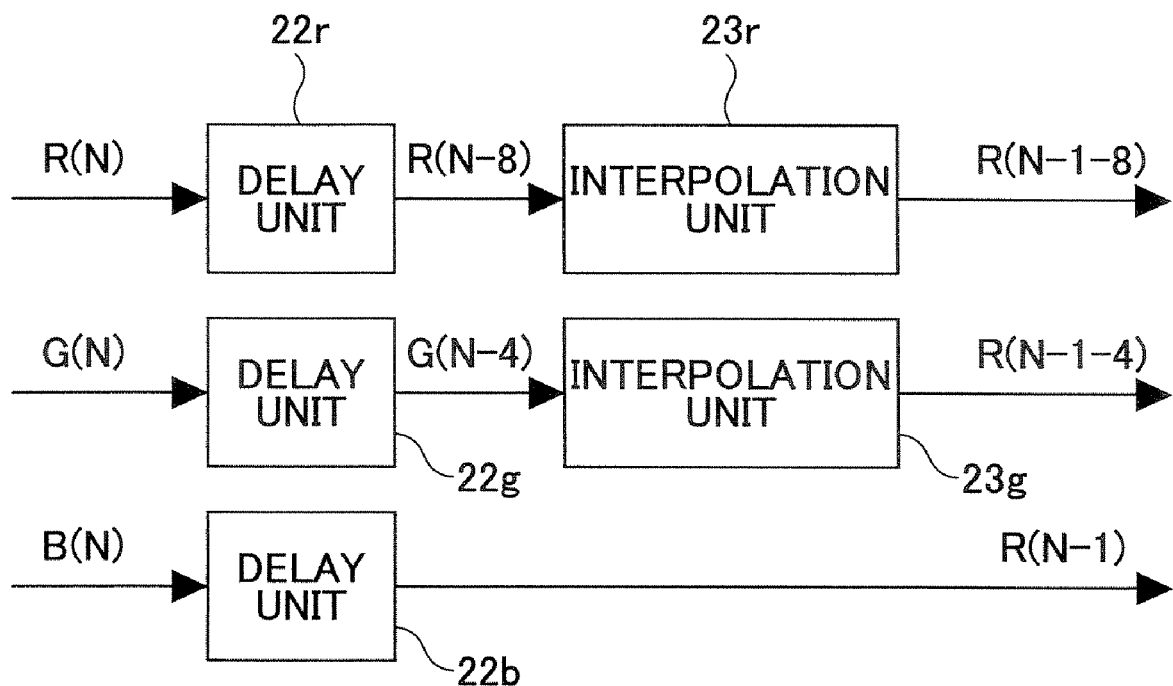
FIG. 21 is a drawing for explaining the operation of the delay units and interpolation units of a related-art image forming apparatus when the displacement between R and B is 8 lines and the displacement between G and B is 4 lines.

FIG. 21 is a drawing for explaining the operation of the delay units and interpolation units of a related-art image forming apparatus when the displacement between R and B is 8 lines and the displacement between G and B is 4 lines. For the same of convenience of explanation, the same reference numerals as those of FIG. 20 are used.

In the related-art configuration, the delay unit 22r introduces an 8-line delay, and the interpolation unit 23r introduces a 1-line delay, with respect to the image data R. The delay unit 22g introduces an 4-line delay, and the interpolation unit 23g introduces a 1-line delay, with respect to the image data G.

Accordingly, when a displacement between adjacent line sensors in the sub-scan direction is an integer multiple of one line, the size of the memories 31r and 31g of the delay units 22r and 22g required for the image forming apparatus (digital copier) of the second embodiment is one-line less than the memory size required in the related-art image forming apparatus.

In general, the maximum displacement between adjacent line sensors in the sub-scan direction is an integer multiple of one line, so that the size of the memories 31r and 31g of the delay units 22r and 22g required for the image forming apparatus of the second embodiment can be set one-line less than the memory size required in the related-art image forming apparatus. Moreover, the second embodiment performs a cubic interpolation computation so as to improve the precision of interpolation, compared with the first embodiment that performs a linear interpolation.

Third Embodiment

In the following, a description will be given of a third embodiment of an image forming apparatus provided with a scanned image correcting apparatus according to the present invention. The third embodiment differs from the first and second embodiments only in the configuration of the scanner image processing unit 263, and a description will be given with focus on such difference.

Figure 22:
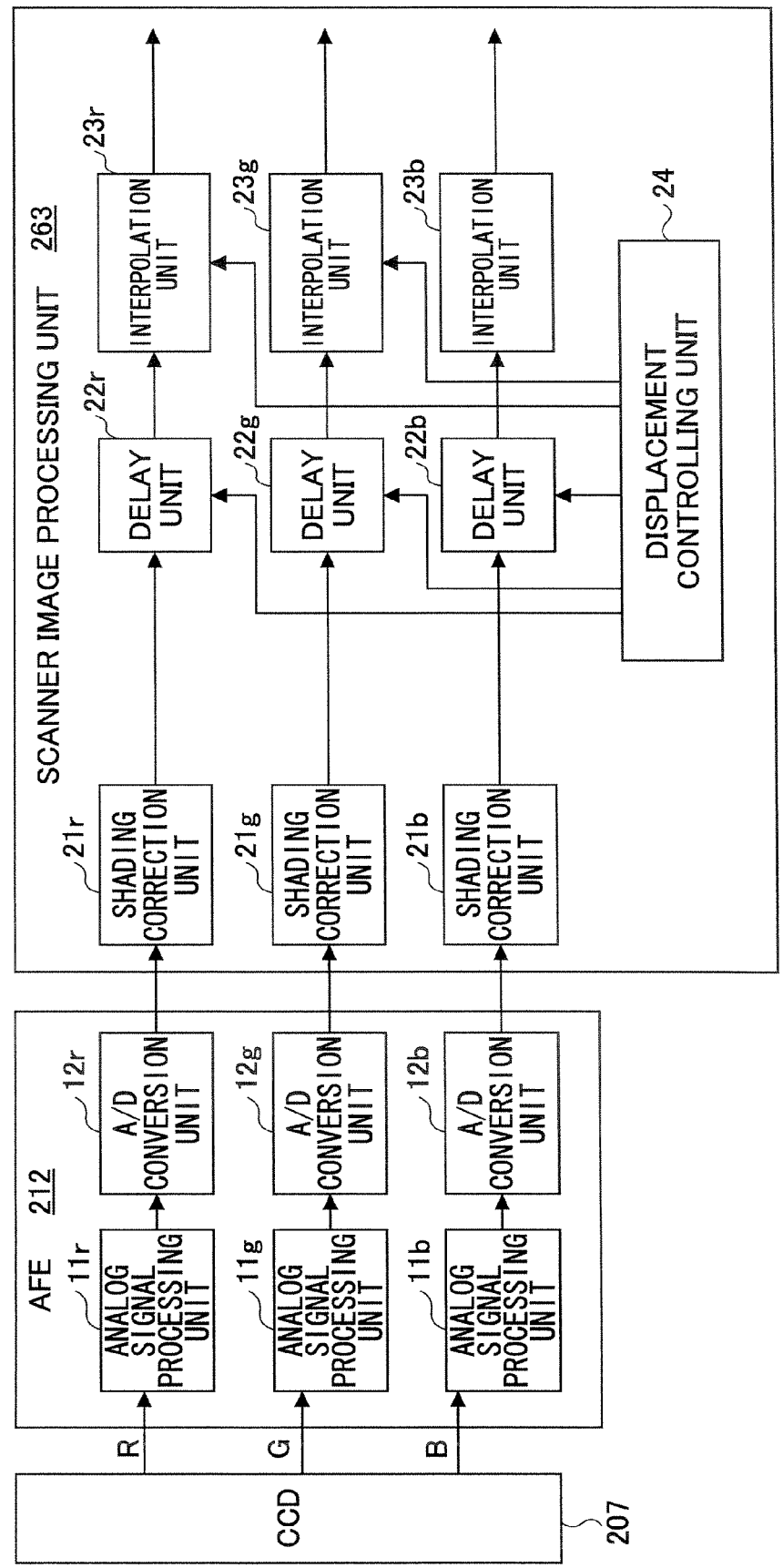
FIG. 22 is a block diagram showing a third example of the configuration of the AFE and scanner image processing unit shown in FIG. 4.

FIG. 22 is a block diagram showing a third example of the configuration of the AFE 212 and the scanner image processing unit 263 shown in FIG. 4. In FIG. 22, the same elements as those of FIG. 15 are referred to by the same numerals.

In the third embodiment, the scanner image processing unit 263 shown in FIG. 22 includes an interpolation unit 23b for the image data B additionally provided on top of the configuration shown in FIG. 15 (second embodiment). This configuration is made in order to cope with the reversal of the displacements between line sensors between the case in which an image of a document placed on the contact glass 231 is scanned and the case in which an image of a document being fed by the auto document feeder 230 is scanned through the scan glass 240.

Figure 23:
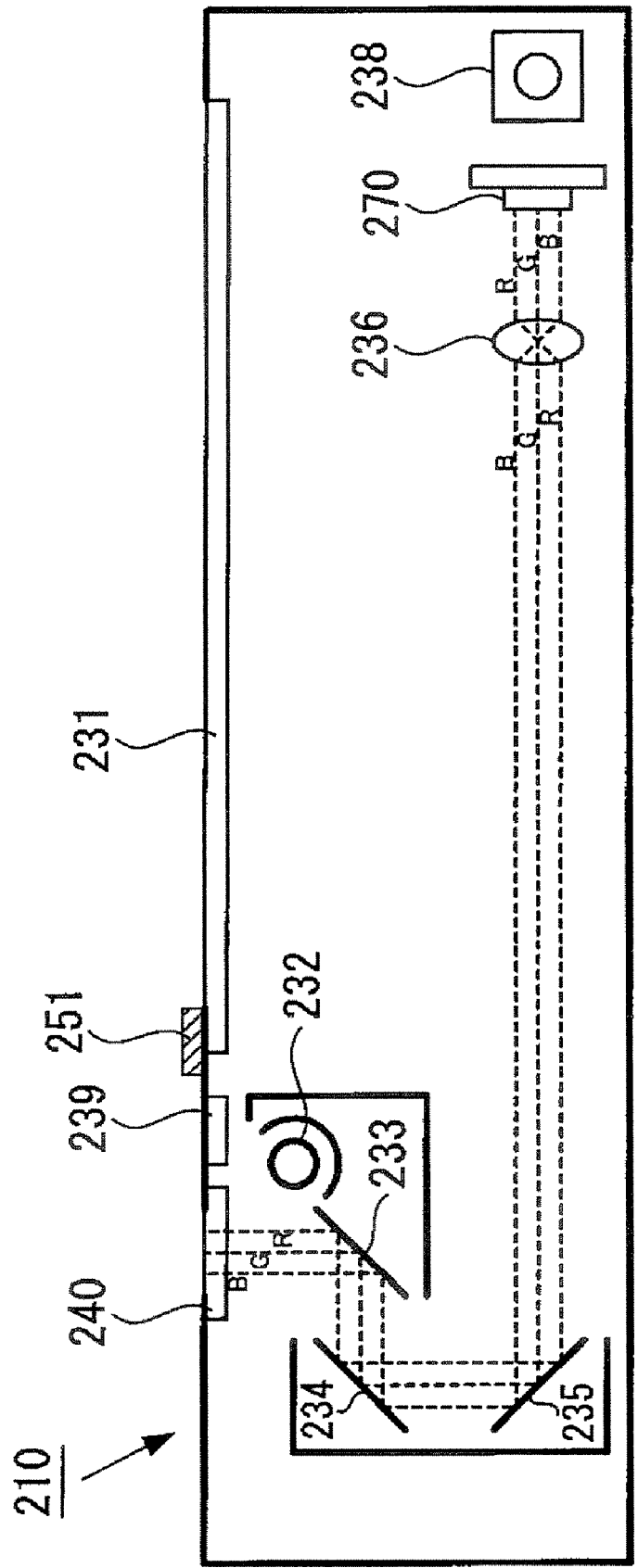
FIG. 23 is a drawing showing image light paths leading to the CCD when an image of a document being fed by the auto document feeder is scanned through a scan glass.

FIG. 23 is a drawing showing image light paths leading to the CCD 207 when an image of a document being fed by the auto document feeder 230 is scanned through the scan glass 240.

When an image of a document being fed by the auto document feeder 230 is scanned through the scan glass 240, the document travels in the sub-scan direction (from left to right in FIG. 23) over the scan glass 240 so as to allow a scan to be performed in the color scanner 210. Because of this, the CCD 207 outputs the image data B first and the image data R last. This order is reversed from the order of scanning a document placed on the contact glass 231. Accordingly, the displacement between the image data G/B and the image data R will be determined by using the image data R as a reference.

The interpolation unit 23b has the same configuration as the interpolation unit 23r. Its operation will later be described.

Among the units shown in FIG. 22, the CCD 207, the analog signal processing units 11r, 11g, and 11b and A/D conversion units 12r, 12g, and 12b of the AFE 212, and the shading correction units 21r, 21g, and 21b and delay units 22r and 22g of the scanner image processing unit 263 perform the same operations as those shown in FIG. 7 (first embodiment) or those shown in FIG. 15 (second embodiment).

When an image of a document placed on the contact glass 231 is to be scanned, the operations of the delay units 22r and 22g and interpolation units 23r and 23g with respect to the image data R and G are the same as those of the first embodiment or the second embodiment.

With respect to the image data B, the delay unit 22b and the interpolation unit 23b do not perform delaying and interpolation, respectively, when the interpolation units 23r and 23g perform linear interpolation (the same as in the first embodiment). Either the delay unit 22b or the interpolation unit 23b is used to delay the image data B by one line when the interpolation units 23r and 23g perform cubic interpolation (the same as in the second embodiment).

When an image of a document being fed by the auto document feeder 230 is to be scanned, the operations of the delay unit 22g and interpolation unit 23g with respect to the image data G are the same as in the case in which an image of a document placed on the contact glass 231 is scanned.

The operations of the delay unit 22r and interpolation unit 23r with respect to the image data R and the operations of the delay unit 22b and interpolation unit 23b with respect to the image data B are the same as the operations of the delay unit 22b and interpolation unit 23b with respect to the image data B and the operations of the delay unit 22r and interpolation unit 23r with respect to the image data R as performed when an image of a document placed on the contact glass 231 is scanned.

Accordingly, when a displacement between adjacent line sensors in the sub-scan direction is an integer multiple of one line, the size of the memories 31r, 31g, and 31b (not shown) of the delay units 22r, 22g, and 22b required for the image forming apparatus of the third embodiment is one-line less than the memory size required in the related-art image forming apparatus.

In general, the maximum displacement between adjacent line sensors in the sub-scan direction is an integer multiple of one line, so that the size of the memories 31r, 31g, and 31b of the delay units 22r, 22g, and 22b required for the image forming apparatus of the third embodiment can be set one-line less than the memory size required in the related-art image forming apparatus. In the third embodiment, further, the interpolation units are provided for all the data (data of all the colors) from all the line sensors, so that the apparatus can cope with any scan operations, whether an image is scanned from a document placed on the contact glass or is scanned from a document being auto-fed through the scan glass.

Fourth Embodiment

In the following, a description will be given of a fourth embodiment of an image forming apparatus provided with a scanned image correcting apparatus according to the present invention. The fourth embodiment differs from the first through third embodiments only in the configuration of the scanner image processing unit 263, and a description will be given with focus on such difference.

Figure 24:
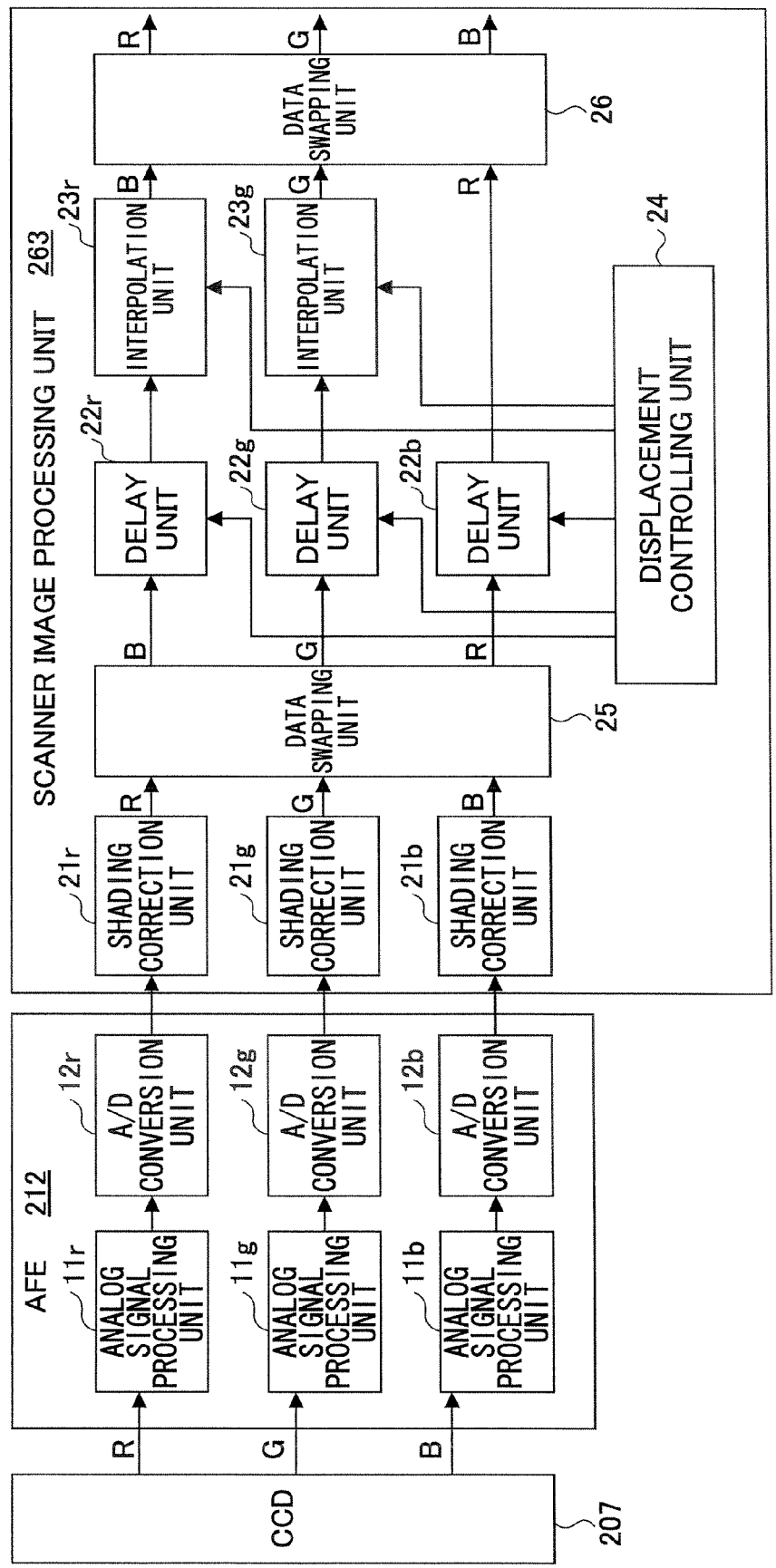
FIG. 24 is a block diagram showing a fourth example of the configuration of the AFE and scanner image processing unit shown in FIG. 4.

FIG. 24 is a block diagram showing a fourth example of the configuration of the AFE 212 and the scanner image processing unit 263 shown in FIG. 4. In FIG. 24, the same elements as those of FIG. 15 are referred to by the same numerals.

In the fourth embodiment, the scanner image processing unit 263 shown in FIG. 24 includes data swapping units 25 and 26 additionally provided on top of the configuration shown in FIG. 15 (second embodiment). As in the third embodiment, this configuration is made in order to cope with the reversal of the displacements between line sensors between the case in which an image of a document placed on the contact glass 231 is scanned and the case in which an image of a document being fed by the auto document feeder 230 is scanned through the scan glass 240.

In the fourth embodiment, the same operation as in the second embodiment is performed when scanning an image of the document placed on the contact glass 231.

FIG. 24 is a drawing showing image data paths in the scanner image processing unit 263 when an image of a document being fed by the auto document feeder 230 is scanned through the scan glass 240. The data swapping unit 25 is used to swap the image data R and the image data B. This configuration allows the correction of image displacement to be performed by the delay unit 22r and the interpolation unit 23r with respect to image data B. Further, the data swapping unit 26 is used to swap the image data R and the image data B so as to return the image data paths to their original arrangement.

The above description has been provided with respect to a case in which the interpolation units 23r and 23g perform cubic interpolation (the same as in the second embodiment) Alternatively, the interpolation units 23r and 23g may perform linear interpolation (as in the first embodiment). In this case, the delay unit 22b becomes unnecessary.

Accordingly, when a displacement between adjacent line sensors in the sub-scan direction is an integer multiple of one line, the size of the memories 31r and 31g (not shown) of the delay units 22r and 22g required for the image forming apparatus of the fourth embodiment is one-line less than the memory size required in the related-art image forming apparatus.

In general, the maximum displacement between adjacent line sensors in the sub-scan direction is an integer multiple of one line, so that the size of the memories 31r and 31g of the delay units 22r and 22g required for the image forming apparatus of the fourth embodiment can be set one-line less than the memory size required in the related-art image forming apparatus. In the fourth embodiment, further, the provision of data swapping units, without providing an additional interpolation unit of the third embodiment, makes it possible to cope with any scan operations, whether an image is scanned from a document placed on the contact glass or is scanned from a document being auto-fed through the scan glass.

Fifth Embodiment

In the following, a description will be given of a fifth embodiment of an image forming apparatus provided with a scanned image correcting apparatus according to the present invention. The fourth embodiment differs from the first through fourth embodiments only in the configuration of the scanner image processing unit 263, and a description will be given with focus on such difference.

Figure 25:
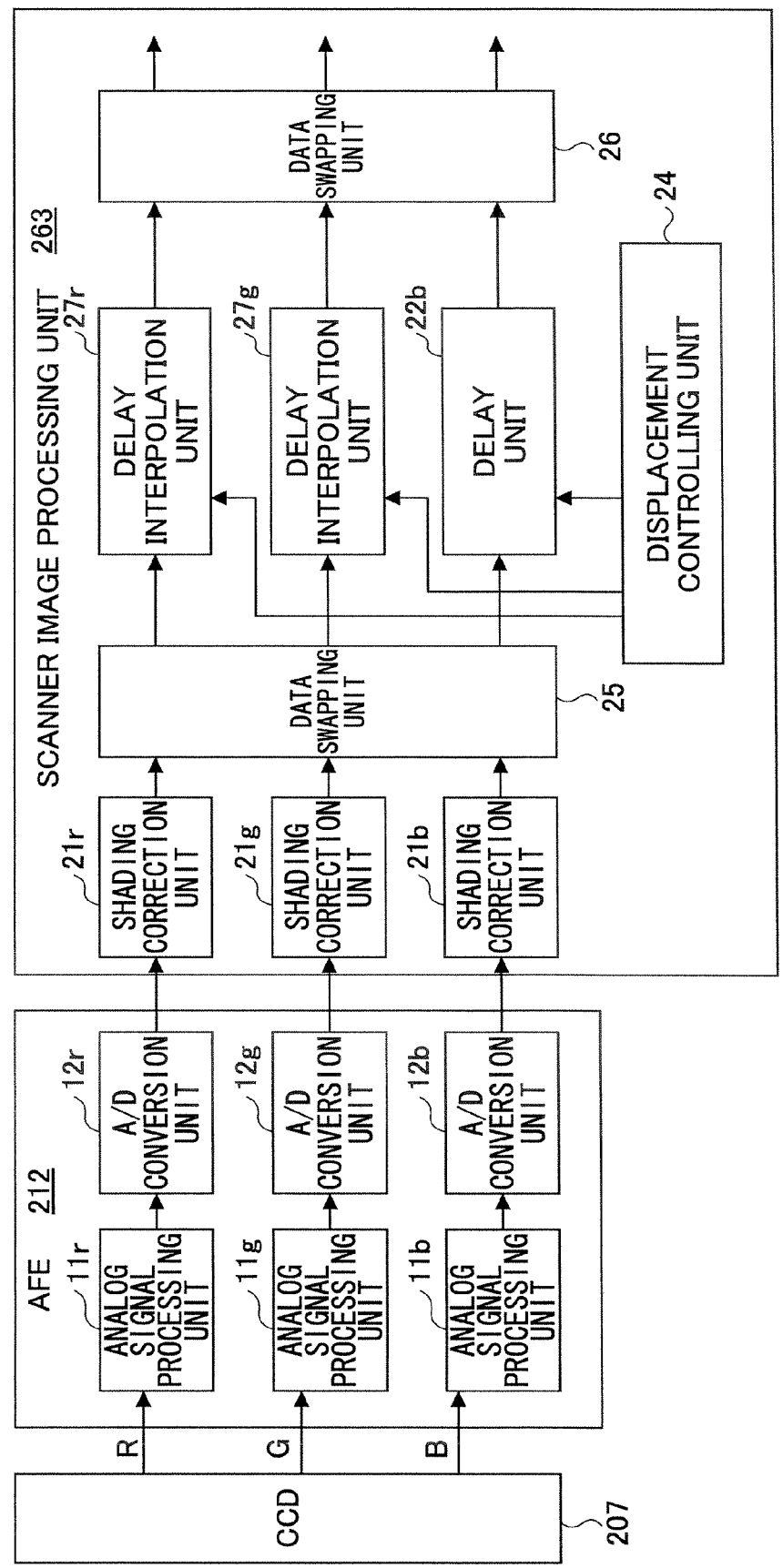
FIG. 25 is a block diagram showing a fifth example of the configuration of the AFE and scanner image processing unit shown in FIG. 4.

FIG. 25 is a block diagram showing a fourth example of the configuration of the AFE 212 and the scanner image processing unit 263 shown in FIG. 4. In FIG. 25, the same elements as those of FIG. 24 are referred to by the same numerals.

In the fifth embodiment, the scanner image processing unit 263 shown in FIG. 25 includes delay interpolation units 27r and 27g in place of the delay units 22r and 22g and the interpolation units 23r and 23g in the configuration shown in FIG. 24 (fourth embodiment).

Figure 26:
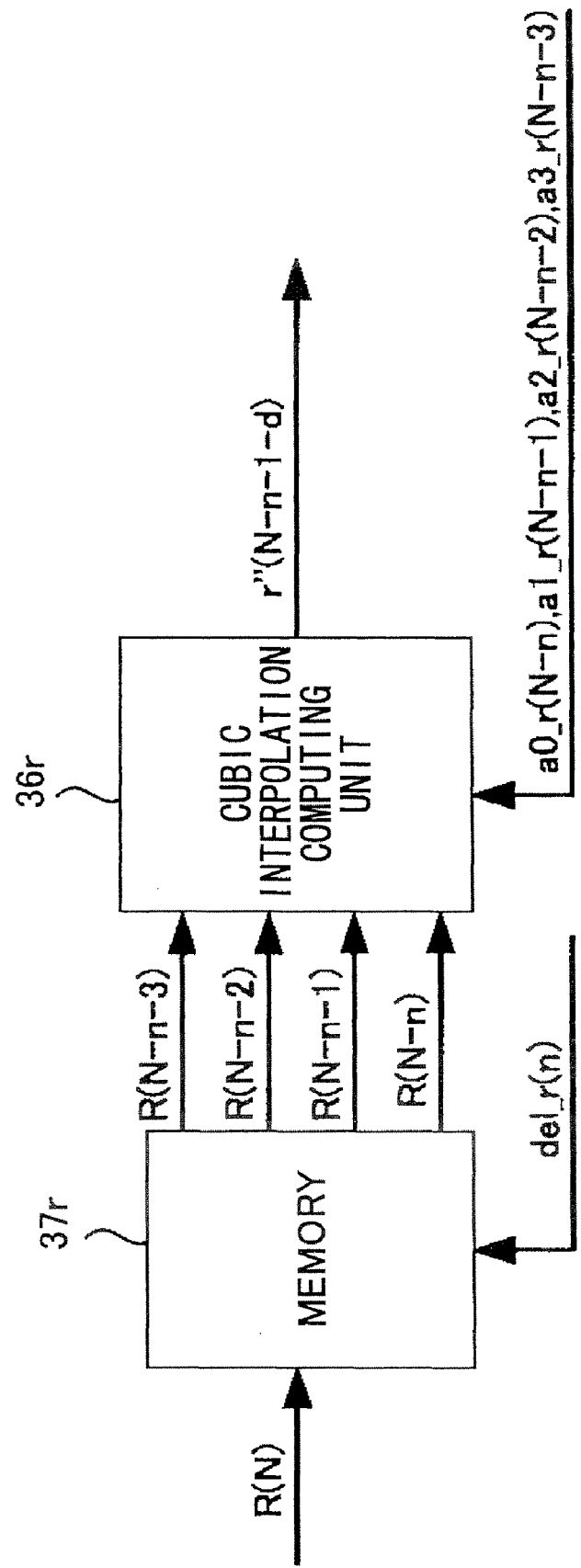
FIG. 26 is a drawing showing an example of the configuration of a delay interpolation unit shown in FIG. 25.

FIG. 26 is a drawing showing an example of the configuration of the delay interpolation unit 27r shown in FIG. 25.

The delay interpolation unit 27r includes a memory 37r for temporarily storing input image data R(M) and a cubic interpolation computing unit 36r for performing a cubic interpolation.

When a delay-amount setting signal del(n) from the displacement controlling unit 24 of FIG. 25 indicates a delay amount n, the memory 37r responds to this delay-amount setting signal by outputting, to the cubic interpolation computing unit 36r, image data R(N-n), R(N-n-1), R(N-n-2), and R(N-n-3) of the n-th preceding line, the n+1-th preceding line, the n+2-th preceding line, and the n+3-th preceding line, respectively.

The cubic interpolation computing unit 36r generates cubically interpolated data r" (N-n-1-d) based on the image data R(N-n), R(N-n-1), R(N-n-2), and R(N-n-3) of the n-th preceding line, the n+1-th preceding line, the n+2-th preceding line, and the n+3-th preceding line having been delayed by the memory 37r, and interpolation coefficients a0_r(N-n), a1_r(N-n-1), a2_r(N-n-2), and a3_r(N-n-3).

Figure 27:
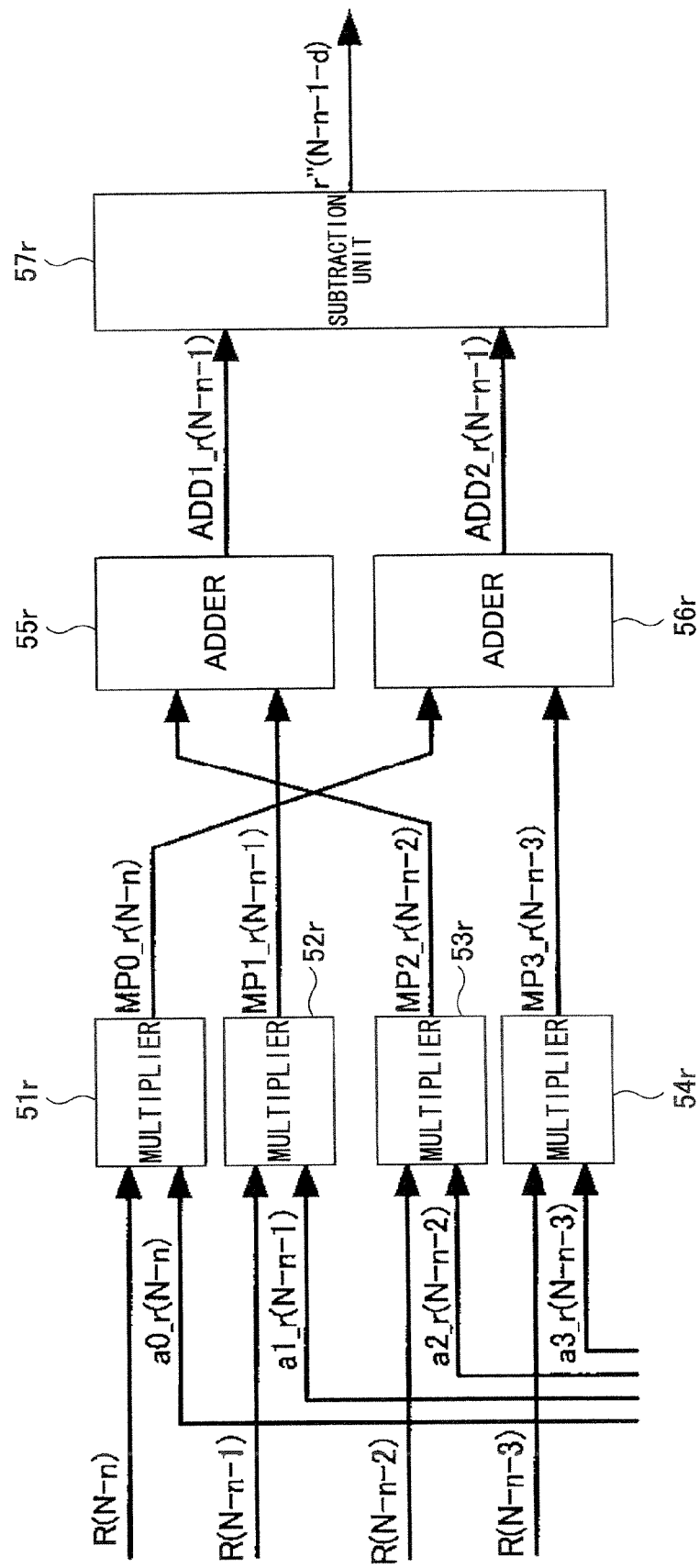
FIG. 27 is a drawing showing an example of the configuration of a cubic interpolation computing unit shown in FIG. 26.

FIG. 27 is a drawing showing an example of the configuration of the cubic interpolation computing unit 36r shown in FIG. 26.

The cubic interpolation computing unit 36r includes multipliers 51r, 52r, 53r, and 54r, adders 55r and 56r, and a subtraction unit 57r as in FIG. 17.

The multiplier 51r multiplies the input image data R(N-n) by the interpolation coefficient a0_r(N-n), and supplies an obtained product MP0_r(N-n) to the adder 56r.

The multiplier 52r multiplies the input image data R(N-n-1) by the interpolation coefficient a1_r(N-n-1), and supplies an obtained product MP1_r(N-n-1) to the adder 55r.

The multiplier 53r multiplies the input image data R(N-n-2) by the interpolation coefficient a2_r(N-n-2), and supplies an obtained product MP2_r(N-n-2) to the adder 55r.

The multiplier 54r multiplies the input image data R(N-n-3) by the interpolation coefficient a3_r(N-n-3), and supplies an obtained product MP3_r(N-n-3) to the adder 56r.

The adder 55r adds the product MP1_r(N-n-1) obtained by the multiplier 52r to the product MP2_r(N-n-2) obtained by the multiplier 53r, and outputs an obtained sum ADD1_r (N-n-1).

The adder 56r adds the product MP0_r(N-n) obtained by the multiplier 51r to the product MP3_r(N-n-3) obtained by the multiplier 54r, and outputs an obtained sum ADD2_r(N-n-1).

The subtraction unit 57r subtracts the sum ADD2_r(N-n-1) obtained by the adder 56r from the sum ADD1_r(N-n-1) obtained by the adder 55r, and outputs the obtained difference as the cubically interpolated data r" (N-n-1-d).

The cubically interpolated data r" (N-n-1-d) is represented by use of a mathematical expression as follows.

$$r"(N-n-1-d)=-a0\_r(N-n)\times R(N-n)+a1\_r(N-n-1)\times R(N-n-1)+a2\_r(N-n-2)\times R(N-n-2)-a3\_r(N-n-3)\times R(N-n-3)$$

Here, the cubically interpolated data is denoted as r" (N-n-1-d) because the memory 37r introduces an n-line delay to the image data, and the cubic interpolation computing unit 36r introduces a 1-line delay to the image data.

Namely, the delay interpolation unit 27r has the combined function of the delay unit 22r and the interpolation unit 23r shown in FIG. 24.

The delay interpolation unit 27g has the same configuration as the delay interpolation unit 27r, and has the combined function of the delay unit 22g and the interpolation unit 23g shown in FIG. 24.

Figure 28:
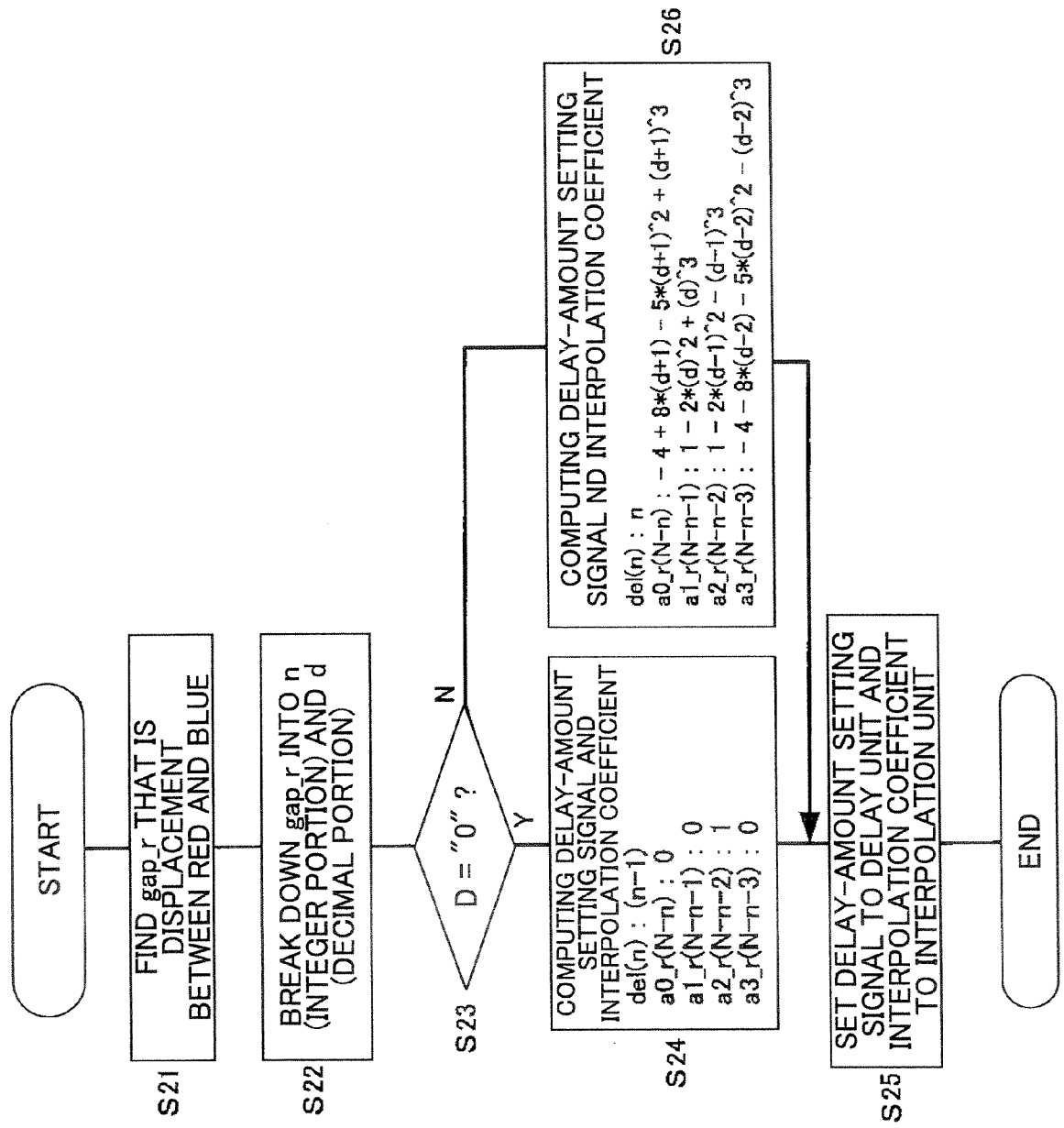
FIG. 28 is a flowchart showing an example of the setting of the delay-amount setting signal and interpolation coefficients by a displacement controlling unit of FIG. 25 with respect to image data R.

FIG. 28 is a flowchart showing an example of the setting of the delay-amount setting signal del(n) and the interpolation coefficients a0_r(N−n), a1_r(N−n−1), a2_r(N−n−2), and a3_r(N−n−3) by the displacement controlling unit 24 of FIG. 25 with respect to the image data R.

This setting process is the same as that shown in FIG. 18, except that "N−n" replaces "M", and a description thereof will be omitted.

The setting of a delay-amount setting signal del_g(n) and interpolation coefficients a0_g(N−n), a1_g(N−n−1), a2_g(N−n−2), and a3_g(N−n−3) for the image data G are substantially the same as described above, and a description thereof will be omitted.

The above description has been provided with respect to a case in which the delay interpolation units 27r and 27g perform cubic interpolation (the same as in the second embodiment) Alternatively, the delay interpolation units 27r and 27g may perform linear interpolation (as in the first embodiment). In this case, the delay unit 22b becomes unnecessary.

Accordingly, when a displacement between adjacent line sensors in the sub-scan direction is an integer multiple of one line, the size of the memories 37r and 37g (not shown) of the delay interpolation units 27r and 27g required for the image forming apparatus of the fifth embodiment is one-line less than the memory size required in the related-art image forming apparatus.

In general, the maximum displacement between adjacent line sensors in the sub-scan direction is an integer multiple of one line, so that the size of the memories 37r and 37g of the delay interpolation units 27r and 27g required for the image forming apparatus of the fifth embodiment can be set one-line less than the memory size required in the related-art image forming apparatus.

Sixth Embodiment

In the following, a description will be given of a sixth embodiment of an image forming apparatus provided with a scanned image correcting apparatus according to the present invention. The configuration of the AFE 212 and the scanner image processing unit 263 is the same as that used in any desired one of the first through fourth embodiments.

Figure 29:
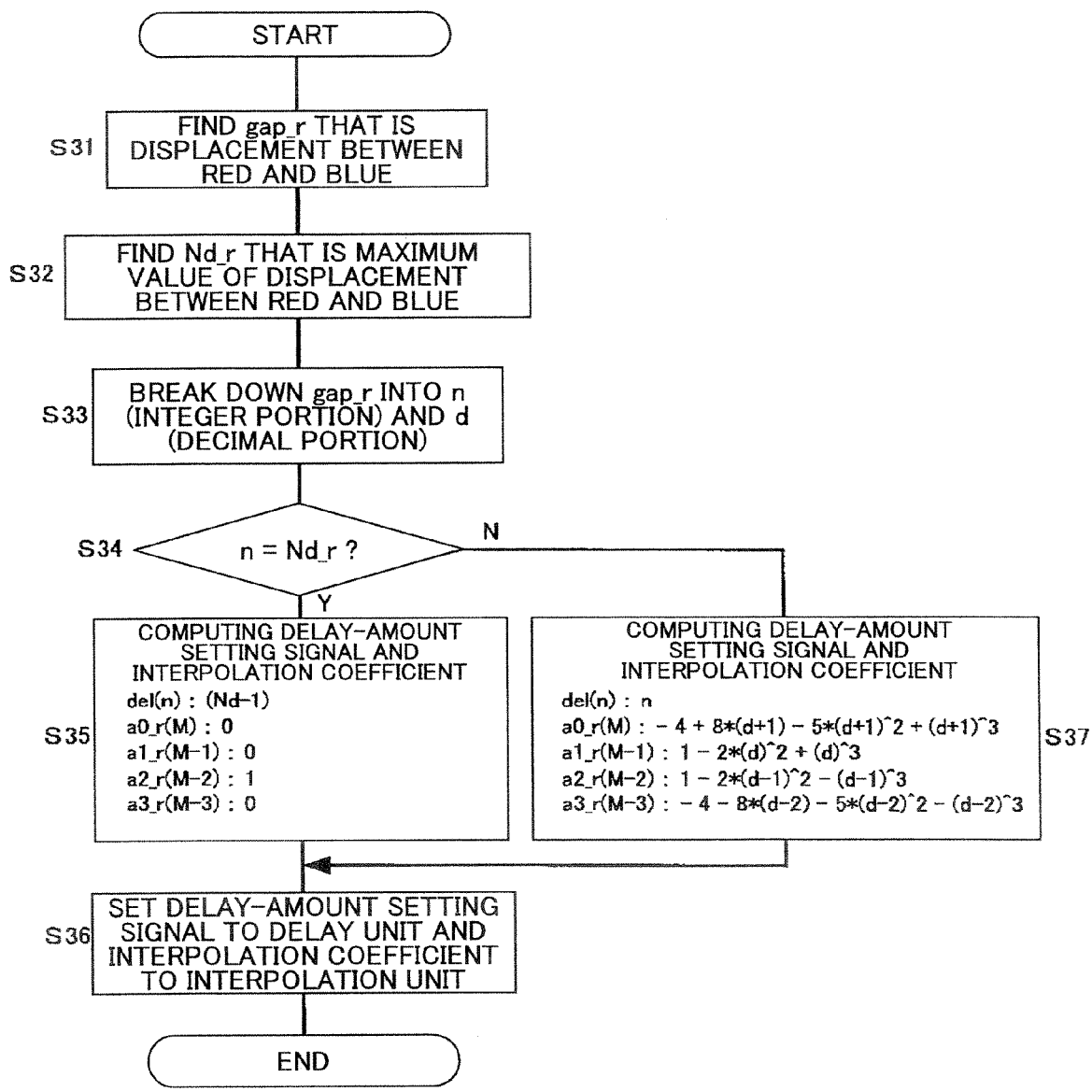
FIG. 29 is a flowchart showing an example of the setting of the delay-amount setting signal and interpolation coefficients by a displacement controlling unit of FIG. 15, FIG. 22, or FIG. 24 with respect to image data R.

FIG. 29 is a flowchart showing an example of the setting of the delay-amount setting signal del(n) and the interpolation coefficients a0_r(M), a1_r(M−1), a2_r(M−2), and a3_r(M−3) by the displacement controlling unit 24 of FIG. 15, FIG. 22, or FIG. 24 with respect to the image data R.

The displacement controlling unit 24 obtains gap_r that indicates a displacement between R(Red) and B(Blue) (i.e., displacement between the image data R and the image data B) at step S31, and obtains Nd_r (Nd_r: integer) that is the maximum value of the displacement at step S32, followed by breaking down gap_r into an integer portion "n" and a decimal portion "d" at step S33. That is, gap_r=n+d (n: integer, d: real number smaller than 1). This displacement gap_r is dependent on the speed at which the carriage travels in the sub-scan direction.

At step S34, a check is made as to whether the integer portion "n" of the displacement is the same as the maximum value "Nd_r"

If the integer portion "n" is the same as the maximum value "Nd_r", the procedure proceeds to step S35 by ascertaining that the displacement is equal to an integer multiple of one line. At step S35, the delay-amount setting signal del_r(n) and the interpolation coefficients a0_r(M), a1_r(M−1), a2_r(M−2), and a3_r(M−3) are computed such that, among the whole displacement equal to Nd_r lines, the displacement for Nd_r−1 lines is corrected by the delay unit 22r, and the displacement for the 1 remaining line is corrected by the interpolation unit 23r. In this case, it suffices for the delay-amount setting signal del_r(n) to indicate the correction of displacement for Nd_r−1 lines despite the fact that the integer portion of the displacement is Nd_r, and, thus, indicates the setting of delay amount Nd_r−1. In this case, the interpolation coefficients a0_r(M), a1_r(M−1), a2_r(M−2), and a3_r(M−3) are "0", "0", "1", and "0", respectively.

If the integer portion "n" is not the same as the maximum value "Nd_r", the procedure proceeds to step S37 by ascertaining that the displacement is not an integer multiple of one line (the displacement is smaller than the maximum value Nd_r). At step S37, the delay-amount setting signal del_r(n) and the interpolation coefficients a0_r(M), a1_r(M−1), a2_r(M−2), and a3_r(M−3) are computed such that, among the whole displacement, the integer portion "n" is corrected by the delay unit 22r, and the decimal portion "d" is corrected by the interpolation unit 23r. In this case, the delay-amount setting signal del_r(n) indicates the setting of a delay amount n, and the interpolation coefficients a0_r(M), a1_r(M−1), a2_r(M−2), and a3_r(M−3) are "$-4+8\times(d+1)-5\times(d+1)^2+(d+1)^3$," "$1-2\times(d)^2+(d)^3$," "$1-2\times(d-1)^2-(d-1)^3$," "$-4-8\times(d-2)-5\times(d-2)^2-(d-2)^3$," respectively.

Namely, if the displacement is not equal to the maximum value Nd_r, the operation is the same as in the related-art image processing apparatus.

The setting of a delay-amount setting signal del_g(n) and interpolation coefficients a0_g(M), a1_g(M−1), a2_g(M−2), and a3_g(M−3) for the image data G are substantially the same as described above, and a description thereof will be omitted.

Accordingly, when a displacement between adjacent line sensors in the sub-scan direction is an integer multiple of one line, the size of the memories 31r and 31g of the delay units 22r and 22g required for the image forming apparatus (digital copier) of the sixth embodiment is one-line less than the memory size required in the related-art image forming apparatus.

In general, the maximum displacement between adjacent line sensors in the sub-scan direction is an integer multiple of one line, so that the size of the memories 31r and 31g of the delay units 22r and 22g required for the image forming apparatus of the sixth embodiment can be set one-line less than the memory size required in the related-art image forming apparatus.

Seventh Embodiment

In the following, a description will be given of a seventh embodiment of an image forming apparatus provided with a scanned image correcting apparatus according to the present invention. In the seventh embodiment, the configuration of the AFE 212 and the scanner image processing unit 263 may be the same as that used in any desired one of the first through fourth embodiments.

FIG. 33 is a flowchart showing an example of the setting of the delay-amount setting signal del(n) and the interpolation coefficients a0_r(M), a1_r(M−1), a2_r(M−2), and a3_r(M−3) by the displacement controlling unit 24 of FIG. 15, FIG. 22, or FIG. 24 with respect to the image data R.

The displacement controlling unit 24 obtains gap_r that indicates a displacement between R(Red) and B(Blue) (i.e., displacement between the image data R and the image data B) at step S41, and obtains Nd_r (Nd_r: integer) that is the maximum value of the displacement at step S42, followed by breaking down gap_r into an integer portion "n" and a decimal portion "d" at step S43.

At step S44, a check is made as to whether the integer portion "n" of the displacement is the same as the maximum value "Nd_r"

If the integer portion "n" is the same as the maximum value "Nd_r", the procedure proceeds to step S46 by ascertaining that the displacement is the maximum value Nd_r. At step S46, the delay-amount setting signal del_r(n) and the interpolation coefficients a0_r(M), a1_r(M−1), a2_r(M−2), and a3_r(M−3) are computed such that "Nd_r−2" lines obtained by subtracting "2" from the maximum value displacement "Nd_r" is corrected by the delay unit 22r, and 2 lines are corrected by the interpolation unit 23r. In this case, the interpolation coefficients a0_r(M), a1_r(M−1), a2_r(M−2), and a3_r(M−3) are "0", "0", "0", and "1", respectively.

If the integer portion "n" is not the same as the maximum value "Nd_r", the procedure proceeds to step S45 by ascertaining that the displacement is smaller than the maximum value Nd_r. At step S44, a check is made as to whether the integer portion "n" of the displacement is the same as "Nd_r−1" that is the maximum value minus one.

If the integer portion "n" is the same as "Nd_r−1" that is the maximum value minus one, the procedure proceeds to step S47 by ascertaining that the integer portion of the displacement is "Nd_r−1" that is the maximum value minus one. At step S47, the delay-amount setting signal del_r(n) and the interpolation coefficients a0_r(M), a1_r(M−1), a2_r(M−2), and a3_r(M−3) are computed such that "Nd_r−2" lines obtained by subtracting "1" from the maximum value minus one "Nd_r−1" is corrected by the delay unit 22r, and 1 line and the decimal portion "d" are corrected by the interpolation unit 23r. In this case, the interpolation coefficients a0_r(M), a1_r(M−1), a2_r(M−2), and a3_r(M−3) are "0", "0", "1−d", and "d", respectively. In this case, two of the interpolation coefficients are set to other than zero, and the remaining coefficients are set to zero, so that the interpolation computation for the decimal portion "d" performed by the interpolation unit 23 becomes linear interpolation rather than cubic interpolation.

If the integer portion "n" is not the same as the maximum value minus one "Nd_r−1", the procedure proceeds to step S48 by ascertaining that the integer portion of the displacement is smaller than the maximum value minus one "Nd_r−1". At step S48, the delay-amount setting signal del_r(n) and the interpolation coefficients a0_r(M), a1_r(M−1), a2_r(M−2), and a3_r(M−3) are computed such that, among the whole displacement, the integer portion "n" is corrected by the delay unit 22r, and the decimal portion "d" is corrected by the interpolation unit 23r. In this case, the interpolation coefficients a0_r(M), a1_r(M−1), a2_r(M−2), and a3_r (M−3) are "−4+8×(d+1)−5×(d+1)$^2$+(d+1)$^3$," "1−2×(d)$^2$+(d)$^3$," "1−2×(d−1)$^2$−(d−1)$^3$," "−4−8×(d−2)−5×(d−2)$^2$−(d−2)$^3$," respectively.

Namely, if the displacement is not equal to the maximum value Nd_r and not equal to the maximum value minus one "Nd_r−1", the operation is the same as in the related-art image processing apparatus.

The setting of a delay-amount setting signal del_g(n) and interpolation coefficients a0_g(M), a1_g(M−1), a2_g(M−2), and a3_g(M−3) for the image data G are substantially the same as described above, and a description thereof will be omitted.

In general, the maximum displacement between adjacent line sensors in the sub-scan direction is an integer multiple of one line, so that the size of the memories 31r and 31g of the delay units 22r and 22g required for the image forming apparatus of the seventh embodiment can be set two lines less than the memory size required in the related-art image forming apparatus.

In the seventh embodiment, the image forming apparatus provided with the scan image correcting apparatus having the interpolation unit for performing cubic interpolation computation uses the interpolation unit to perform correction for 2 lines if the displacement is equal to the maximum value, and uses the interpolation unit to perform correction for 1 line as well as correction for a decimal portion by use of a lower-order interpolation computation (e.g., linear interpolation in the seventh embodiment). This makes it possible to reduce the memory size necessary for the delay unit by two lines, compared with related-art apparatuses. Similarly, an image forming apparatus provided with a scan image correcting apparatus having an interpolation unit for performing an interpolation computation of fifth-order or more may use the interpolation unit to perform a lower-order interpolation computation if the displacement is equal to or close to the maximum value. This makes it possible to reduce the memory size necessary for the delay unit by three lines or more, compared with related-art apparatuses.

[Other]

The embodiments described above have been directed to a case in which the image data B is output last when an image of a document placed on the contact glass 231 is scanned (in the color scan mode). The present invention is equally applicable to a case in which the image data G or R is output last.

Further, the correction of displacement may not be performed if only one image data item is used, among multiple image data items obtained from the multiple line sensors, to form an image. It should be noted that the image formed based on image data form the line sensors is not only an image printed by a plotter, but includes a scanned image such as a scanner image.

Further, the above embodiments have been described with reference to a case in which the image sensor has line sensors for the respective R, G, and B colors arranged at predetermined intervals. The present invention is not limited to such a configuration, and is applicable to a configuration in which the image sensor has two or more line sensors arranged at predetermined intervals. For example, the image sensor may have a plurality of line sensors for the same single color, or have a plurality of line sensors for each of the R, G, and B colors. Another conceivable configuration is that the image sensor includes a monochrome line sensor in addition to the R, G, and B line sensors. In this case, an image is formed based on the image data supplied from the R, G, and B line sensors when the color scan mode is selected, and is formed based on the image data supplied from the monochrome line sensor if the monochrome scan mode is selected.

Figure 30:
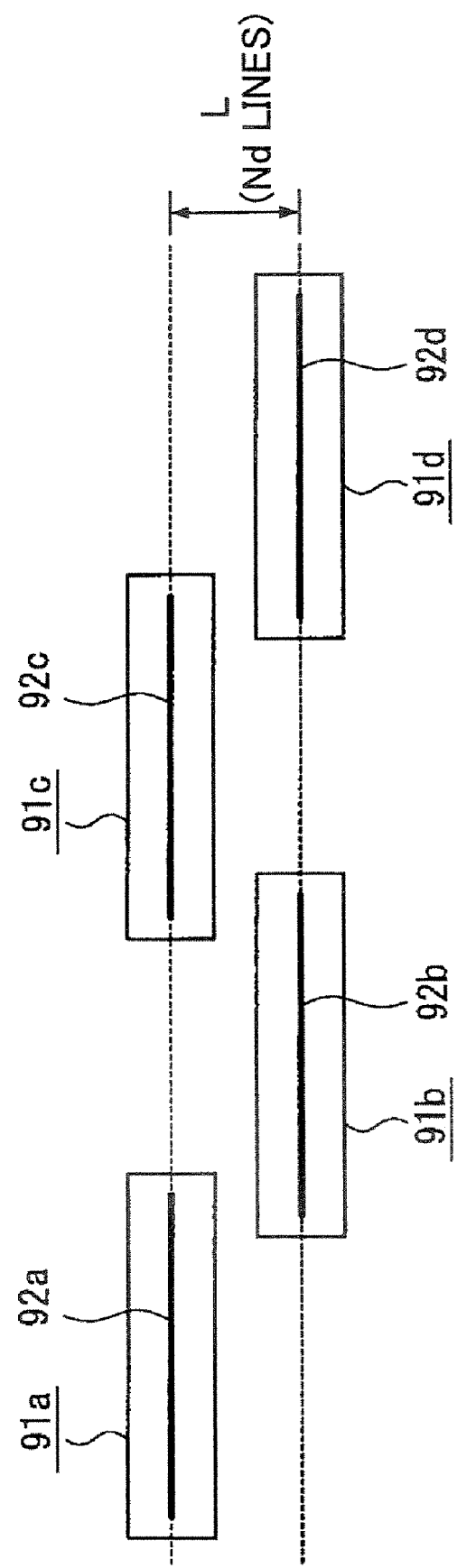
FIG. 30 is a drawing showing an example of the arrangement of multiple contact image sensors.
Figure 31:
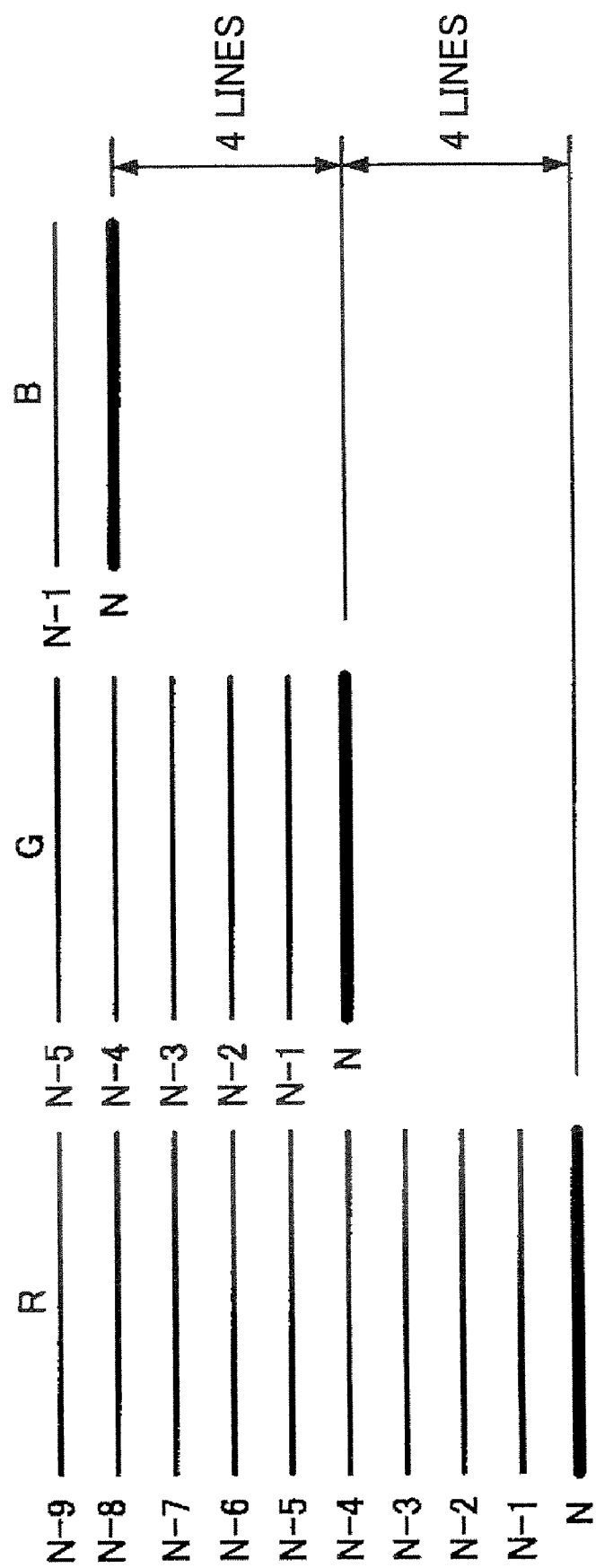
FIG. 31 is a drawing showing an example of the arrangement of multiple line sensors.
Figure 32:
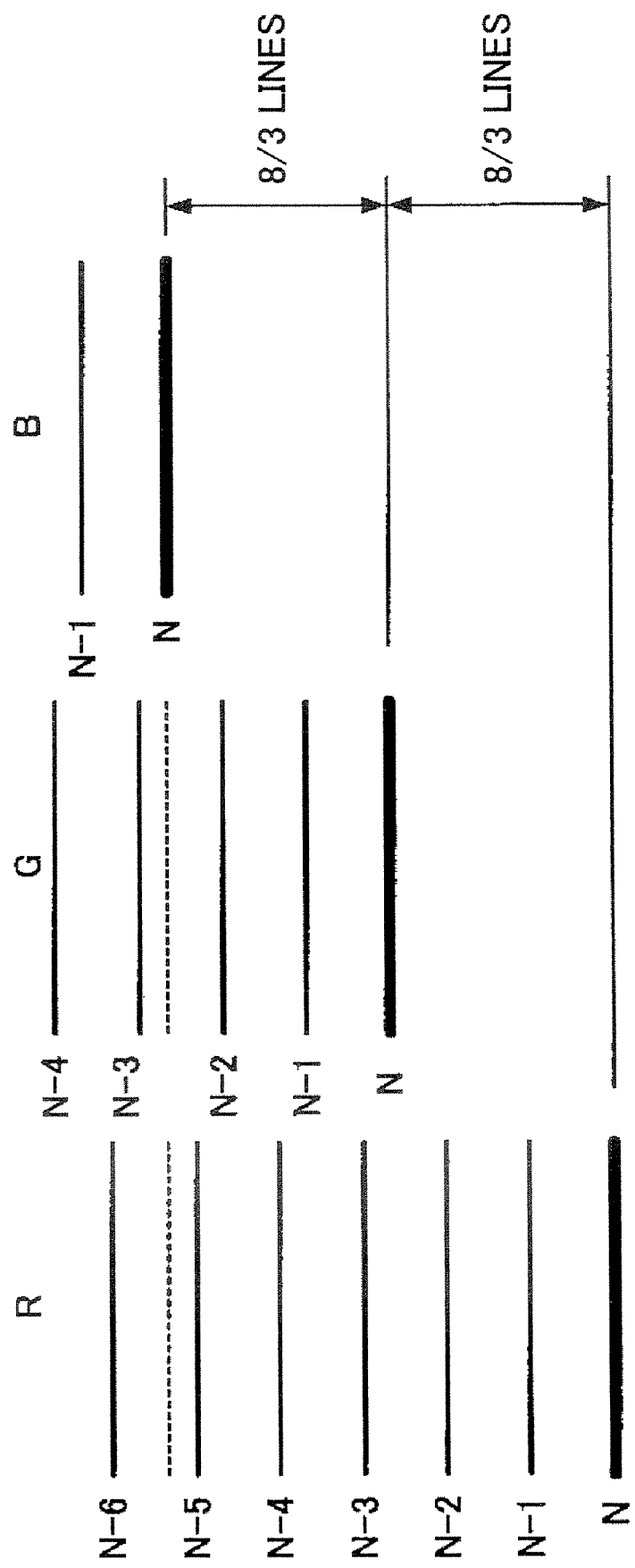
FIG. 32 is a drawing showing another example of the arrangement of multiple line sensors.

Moreover, the above embodiments have been described with reference to a case in which only one image sensor is provided. The present invention is equally applicable to a case in which a plurality of image sensors are provided in the image scan unit, and each of the image sensors are arranged at predetermined intervals. For example, as shown in FIG. 30, CIS (contact image sensors) 91a through 91d may be arranged at predetermined intervals, with line sensors 92a through 92d provided in the respective CIS being arranged at the interval L.

Moreover, the above embodiments have been described with reference to a case in which the delay units and interpolation units have memories for respective colors. The present invention is equally applicable to a case in which the delay units and interpolation units share a common memory, and use different portions of the memory.

Moreover, the above embodiments have been described with reference to a case in which the memory is included in the scanner image processing unit 263. This is not a limiting example, and the present invention is also applicable to a case in which another memory medium such as the HDD 271, the MEM-C 276, or the MEM-P 279 in the digital copier 1 is used as the relevant memory.

Also, the present invention is applicable to a case in which an external memory medium (e.g., SD card) connected via an external interface such as the NIC 280, the USB device 281, the IEEE1394 device 282, the Centronics device 283, or the FCU 287 is used as the relevant memory.

The present invention is also applicable when a memory medium (e.g., HDD) connected to or embedded in an external apparatus (e.g., personal computer or workstation) connected via an external interface is used as the concerned memory.

Moreover, the above embodiments have been described with reference to a case in which the delay units are positioned first and the interpolation units are positioned next. The present invention is equally applicable to a case in which the interpolation units are positioned first and the delay units are positioned next.

Moreover, the above embodiments have been described with reference to a case in which the delay units and interpolation units perform their respective processes consecutively. The present invention is equally applicable to a case in which other image processing (e.g., shading correction, gamma correction) is performed between the delay units and the interpolation units.

Moreover, the above embodiments have been described with reference to a case in which the document image scan mechanism, the delay units, and the interpolation units are embedded in the digital copier 1. The present invention is equally applicable to a case in which the document image scan mechanism, the delay units, and the interpolation units are embedded in an image scan apparatus such as a scanner. The present invention is also applicable to a case in which at least one of the delay units and interpolation units is embedded in another apparatus different from the apparatus having the document image scan mechanism. For example, a scanner having a document image scan mechanism and an external apparatus having the delay units and interpolation units are connected together, so that the image data output from the scanner is subjected to the processing by the delay units and interpolation units of the external apparatus.

If at least one of the delay units and interpolation units is embedded in another apparatus different from the apparatus having the document image scan mechanism, the memory used for the processes performed by the delay units and interpolation units may be at least one of a memory medium provided in the delay units and interpolation units, a memory medium provided in the apparatus having the delay units and interpolation units, an external memory medium connected through an external interface provided in the apparatus having the delay units and interpolation units, and an external memory medium (e.g., HDD) embedded in or connected to an apparatus (inclusive of an apparatus having a document image scan mechanism) connected through an external interface provided in the apparatus having the delay units and interpolation units. The present invention is applicable to any one of these configurations.

A program according to the present invention serves to cause the CPU (computer) of a digital copier or external apparatus to perform the functions of the delay units, interpolation units, displacement-amount controlling unit, and data swapping units. Such program is executed by a computer to achieve the advantages that have been described heretofore.

This program may be provided as being pre-stored in a memory means such as a ROM or HDD, or may be provided through a nonvolatile record medium (memory) such as a CD-ROM, flexible disc, SRAM, EEPROM, or memory card. The program recorded in such memory is installed in a digital copier or external apparatus for execution by a CPU, or the CPU is instructed to read the program from the memory for execution, thereby performing each step of the above-described procedures.

It is also possible to execute the program by downloading the program from an external apparatus having a record medium with the program recorded therein or from an external apparatus having the program recorded in the memory means thereof.

As is apparent from the above descriptions, the present invention can reduce the memory size required for the correction of displacement of scan positions (by one or more lines, compared with the related-art configuration). Accordingly, the use of the present invention makes it possible to provide an image scan apparatus that can correct the displacement of scan positions at low cost and an image forming apparatus that can acquire high-quality image at low cost.

Further, the present invention is not limited to these embodiments, but various variations and modifications may be made without departing from the scope of the present invention.

The present application is based on Japanese priority application No. 2005-343520 filed on Nov. 29, 2005, and Japanese priority application No. 2006-302139 filed on Nov. 7, 2006, with the Japanese Patent Office, the entire contents of which are hereby incorporated by reference.

What is claimed is:

1. An apparatus for correcting a scanned image by aligning, in a sub-scan direction, first image data and second image data corresponding to two of a plurality of sensor lines, respectively, when the plurality of sensor lines each extending in a main scan direction and arranged at intervals in the sub-scan direction is scanned relative to a scan object in the sub-scan direction such that each of the plurality of sensor lines scans image data at a predetermined line interval in the subs-scan direction, the apparatus comprising:

a delay circuit configured to delay the first image data by a delay amount corresponding to an integer multiple of the line interval;

an interpolation circuit configured to perform an interpolation computation responsive to interpolation coefficients with respect to two or more lines included in the first image data delayed by the delay circuit; and a control circuit configured to set the delay amount to the delay circuit and the interpolation coefficients to the interpolation circuit, wherein the control circuit is configured to set the delay amount to an amount corresponding to integer m smaller than integer n and set the interpolation coefficients such that the interpolation computation becomes equivalent to a computation introducing a delay equal to n–m lines if an interval between the first image data and the second image data is n times the line interval.

2. The apparatus as claimed in claim 1, wherein the interpolation coefficients includes two or more coefficients corresponding to the two or more lines, respectively, and the control circuit is configured to set one of the two or more coefficients to "1" and remaining one or ones of the two or more coefficients to "0" thereby to make the interpolation computation equivalent to the computation introducing a delay equal to n−m lines.

3. The apparatus as claimed in claim 1, wherein a maximum delay amount settable by the delay circuit is a delay amount corresponding to integer m.

4. The apparatus as claimed in claim 1, wherein the interpolation computation by the interpolation circuit is an interpolation computation of k-th order (k: integer equal to or more than 3), and the control circuit is configured to set the interpolation coefficients such as to make the interpolation computation equivalent to an interpolation computation of an order smaller than the k-th order if an interval between the first image data and the second image data is larger than a preset interval and is not an integer multiple of the predetermined line interval.

5. The apparatus as claimed in claim 4, wherein the interpolation coefficients includes two or more coefficients corresponding to the two or more lines, respectively, and the control circuit is configured to set at least two of the two or more coefficients to other than "0" and remaining one or ones of the two or more coefficients to "0" thereby to make the interpolation computation equivalent to the interpolation computation of an order smaller than the k-th order.

6. An apparatus for scanning an image, comprising:
the apparatus for correcting a scanned image as claimed in claim 1; and
an image scan unit including the plurality of sensor lines.

7. An apparatus for forming an image, comprising:
the apparatus for correcting a scanned image as claimed in claim 1;
an image scan unit including the plurality of sensor lines; and
an image forming unit configured to print image data.

8. An apparatus for correcting a scanned image by aligning, in a sub-scan direction, first image data and second image data corresponding to two of a plurality of sensor lines, respectively, when the plurality of sensor lines each extending in a main scan direction and arranged at intervals in the sub-scan direction is scanned relative to a scan object in the sub-scan direction such that each of the plurality of sensor lines scans image data at a predetermined line interval in the subs-scan direction, the apparatus comprising:
a delay circuit having a first memory having a capacity corresponding to data for m lines (m: integer), and configured to delay the first image data through the first memory by a delay amount corresponding to an integer multiple of the line interval;
an interpolation circuit having a second memory having a capacity corresponding to data for at least one line, and configured to perform an interpolation computation responsive to interpolation coefficients with respect to the first image data delayed by the delay circuit and image data made by further delaying, through the second memory, the first image data delayed by the delay circuit; and
a control circuit configured to set the delay amount to the delay circuit and the interpolation coefficients to the interpolation circuit,
wherein the control circuit is configured to set the delay amount and the interpolation coefficients such as to utilizes the second memory of the interpolation circuit in order to secure a delay equal to n−m lines in excess of the capacity for the m line of the first memory of the delay circuit if an interval between the first image data and the second image data is n (n: integer lager than m) times the line interval, thereby providing a delay corresponding to a total of n lines by use of a combination of the first memory of the delay circuit and the second memory of the interpolation circuit.

9. The apparatus as claimed in claim 8, wherein the interpolation coefficients includes two or more coefficients, and the control circuit is configured to set one of the two or more coefficients to "1" and remaining one or ones of the two or more coefficients to "0" thereby to make the interpolation computation equivalent to the computation introducing a delay equal to n−m lines.

* * * * *